(12) United States Patent
Takeuchi et al.

(10) Patent No.: US 10,808,159 B2
(45) Date of Patent: Oct. 20, 2020

(54) THERMOELASTIC COOLING

(71) Applicants: University of Maryland, College Park, College Park, MD (US); Jun Cui, Richland, WA (US)

(72) Inventors: Ichiro Takeuchi, Laurel, MD (US); Jun Cui, Richland, WA (US); Manfred R. Wuttig, Silver Spring, MD (US); Yiming Wu, Shoreview, MN (US); K. Reinhard Radermacher, Silver Spring, MD (US); Yunho Hwang, Ellicott City, MD (US); Jan Muehlbauer, Bowie, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 16/180,649

(22) Filed: Nov. 5, 2018

(65) Prior Publication Data

US 2019/0085228 A1    Mar. 21, 2019

Related U.S. Application Data

(62) Division of application No. 13/431,768, filed on Mar. 27, 2012, now Pat. No. 10,119,059.

(60) Provisional application No. 61/550,866, filed on Oct. 24, 2011, provisional application No. 61/474,172, filed on Apr. 11, 2011.

(51) Int. Cl.
*C09K 5/14*    (2006.01)
*F25B 23/00*   (2006.01)

(52) U.S. Cl.
CPC .............. *C09K 5/14* (2013.01); *F25B 23/00* (2013.01)

(58) Field of Classification Search
CPC . C09K 5/14; F25B 23/00; C22F 1/006; C22F 1/10; C22F 1/08; F28F 2255/04; F28F 2255/00; F28F 2255/02; F28F 2255/12
USPC ............................................... 62/467
See application file for complete search history.

(56) References Cited

U.S. PATENT DOCUMENTS

| 3,036,444 A | 5/1962 | Cochran |
| 3,430,441 A | 3/1969 | Adams |
| 3,599,443 A | 8/1971 | Paine et al. |
| 3,883,459 A | 5/1975 | Kent |
| 3,913,326 A | 10/1975 | Banks |

(Continued)

FOREIGN PATENT DOCUMENTS

| CN | 1193718 A | 9/1998 |
| CN | 1641294 A | 7/2005 |

(Continued)

OTHER PUBLICATIONS

Annaorazov et al., "Heat pump cycles based on the AF-F transition in Fe—Rh alloys induced by tensile stress," *International Journal of Refrigeration*, 2002, 25: pp. 1034-1042.

(Continued)

*Primary Examiner* — Steve S Tanenbaum
(74) *Attorney, Agent, or Firm* — Klarquist Sparkman, LLP

(57) ABSTRACT

A cooling system based on thermoelastic effect is provided. The system comprises a heat sink, a refrigerated space and a regenerator coupled to the refrigerated space and to the heat sink to pump heat from the refrigerated space to the heat sink. The regenerator comprises solid thermoelastic refrigerant materials capable of absorbing or releasing heat.

20 Claims, 15 Drawing Sheets

(56) References Cited

U.S. PATENT DOCUMENTS

| | | |
|---|---|---|
| 4,027,479 A | 6/1977 | Cory |
| 4,637,962 A * | 1/1987 | Albrecht ............... B32B 15/01 |
| | | 228/262.3 |
| 4,759,187 A | 7/1988 | O'Hare |
| 4,922,718 A | 5/1990 | Hochstein et al. |
| 5,339,653 A | 8/1994 | DeGregoria |
| 5,465,781 A | 11/1995 | DeGregoria |
| 5,727,616 A | 3/1998 | Groenke |
| 6,129,181 A | 10/2000 | Weems |
| 6,332,323 B1 | 12/2001 | Reid et al. |
| 6,367,281 B1 | 4/2002 | Hugenroth |
| 6,458,319 B1 | 10/2002 | Caillat et al. |
| 6,574,958 B1 | 6/2003 | MacGregor |
| 7,629,531 B2 | 12/2009 | Stark |
| 8,455,751 B2 | 6/2013 | Olsen et al. |
| 9,179,575 B1 | 11/2015 | Yao |
| 2002/0105997 A1 | 8/2002 | Zhang |
| 2004/0191556 A1 | 9/2004 | Jardine |
| 2004/0241004 A1 | 12/2004 | Goodson et al. |
| 2005/0074647 A1 | 4/2005 | Arthur |
| 2006/0191288 A1 | 8/2006 | Radermacher et al. |
| 2010/0090356 A1 | 4/2010 | Sines et al. |
| 2010/0236236 A1 | 9/2010 | Mankame et al. |
| 2010/0258265 A1 | 10/2010 | Karanikas et al. |
| 2011/0030337 A1 | 2/2011 | Mons |
| 2011/0121582 A1 | 5/2011 | Alexander et al. |
| 2012/0031133 A1 | 2/2012 | Kuwabara et al. |
| 2014/0334106 A1 | 11/2014 | Prest et al. |
| 2016/0084544 A1 | 3/2016 | Radermacher et al. |
| 2016/0369400 A1 | 12/2016 | Maxwell et al. |
| 2017/0082326 A1 | 3/2017 | Fisher et al. |
| 2017/0138648 A1 | 5/2017 | Cui et al. |

FOREIGN PATENT DOCUMENTS

| | | |
|---|---|---|
| CN | 102007363 A | 4/2011 |
| EP | 1555494 A2 | 7/2005 |
| JP | S57-192761 A * | 11/1982 |
| JP | S57-192761 A | 11/1982 |
| JP | 4318567 B2 | 8/2009 |
| WO | WO 2001/035033 A1 | 5/2001 |
| WO | WO 2002/084185 A1 | 10/2002 |

OTHER PUBLICATIONS

Annaorazov et al., "Magnetocaloric heat-pump cycles based on the AF-F transition in Fe—Rh alloys," *Journal of Magnetism and Magnetic Materials*, 2002, 251: pp. 61-73.

Backhaus et al., "A thermoacoustic Stirling heat engine," *Nature*, May 1999, 399: pp. 335-338.

Bejan, A. *Advanced engineering thermodynamics*, Second Edition, 1997, John Wiley & Sons, Inc., New York, NY, pp. 203-211.

Bonnot et al., "Elastocaloric effect associated with the martensitic transition in shape-memory alloys," *Physical Review Letters*, 2008, 100(12): 125901, arXiv:0802.2009 [cond-mat.mtrl-sci] [online].

Brown, "Magnetic heat pumping near room temperature," *Journal Applied Physics*, Aug. 1976, 47(8): pp. 3673-3680.

Cui et al., "Combinatorial search of thermoelastic shape-memory alloys with extremely small hysteresis width," *Nature Materials*, Apr. 2006, 5: pp. 286-290.

Farris, R.J., "Rubber heat engines, Analyses and Theory," *Polymer Engineering and Science*, Oct. 1977, 17(10): pp. 737-744.

Garrett, S.L., "Resource letter: TA-1: Thermoacoustic engines and refrigerators," *Am. J. Phys.*, Jan. 2004, 72(1): pp. 11-17.

Gscneidner, JR et al., "Magnetic cooling for appliances," *Proceedings of the 50th Annual International Conference on Appliance Technology*, 1999, pp. 144-150.

Gscneidner, JR et al., "Magnetocaloric materials," *Annu. Rev. Mater. Sci.*, 2000, 30: pp. 387-429.

Hall et al., "Analyzing magnetic refrigeration efficiency: a rotary AMR—Reverse Brayton case study," *Advances in Cryogenic Engineering*, 1998, 43: pp. 1719-1728.

Ho et al., "Stress induced phase changing material for thermoacoustic refrigeration," *Integrated Ferroelectrics*, 2008, 101: pp. 89-100.

Kauffman et al., "The story of nitinol: The serendipitous discovery of the memory metal and its applications," *The Chemical Educator*, 1996, 2(2): pp. 1-21.

Kim et al., "Solar refrigeration options—a state of the art review," *International Journal of Refrigeration*, 2008, 31: pp. 3-15.

Leo et al., "Transient heat transfer effects on the psuedoelastic behavior of shape-memory wires," *Acta metall. mater.*, 1993, 41(8): pp. 2477-2485.

Lyon et al., "Polyurethane-urea elastomers as working substances in rubber heat engines," *Journal of Applied Polymer Science*, 1984, 29: pp. 2857-2872.

Manosa et al., "Giant solid-state barocaloric effect in the Ni—Mn—In magnetic shape-memory alloy," *Nature Materials*, Jun. 2010, 9: pp. 478-481.

Manosa et al., "The use of shape-memory alloys for mechanical refrigeration," *Functional Materials Letters*, 2009, 2(2): pp. 73-78.

McKelvey et al., "Fatigue-crack propagating in nitinol, a shape-memory and superelastic endovascular stent material," *Journal of Biomedical Materials Research*, Dec. 1999, 47(3): pp. 301-308.

Mischenko et al., "Giant electrocaloric effect in thin-film $PbZr_{0.95}Ti_{0.05}O_3$," *Science*, Mar. 2006, 311: 1270-71.

National Economic Council, "A strategy for American innovation: Driving towards sustainable growth and quality jobs," 2009 [online]. Retrieved from the Internet: <URL: http://www.whitehouse.gov/administration/eop/nec/StrategyforAmericanInnovation>.

Neese et al., "Large electrocaloric effect in ferroelectric polymers near room temperature," *Science*, Aug. 2008, 321: pp. 821-823.

Ng et al., "Stress-induced phase transformation and detwinning in NiTi polycrystalline shape memory alloy tubes," *Mechanics of Materials*, 2006, 38: pp. 41-56.

Office Action (1st), dated Aug. 7, 2014, in Chinese Patent Application No. 201210105214.6.

Office Action (2nd), dated Apr. 24, 2015, in Chinese Patent Application No. 201210105214.6.

Office Action (3rd), dated Jan. 13, 2016, in Chinese Patent Application No. 201210105214.6.

Office Action, dated Jun. 23, 2015, in Japanese Patent Application No. 2012-086194.

Pecharsky et al., "Giant magnetocaloric effect in $Gd_5(Si_2Ge_2)$," *Physical Review Letters*, Jun. 1997, 78(23): pp. 4494-4497.

Quarini et al., "Solid state refrigeration: Cooling and refrigeration using crystalline phase changes in metal alloys," *Journal of Mechanical Engineering Science*, 2004, 218: pp. 1175-1179.

Shaw et al., "Tips and tricks for characterizing shape memory alloy wire: Part I—differential scanning calorimetry and basic phenomena," *Experimental Techniques*, 2008, pp. 55-62.

Sinyavskii, "Electrocaloric refrigerators: A promising alternative to current low-temperature apparatus," *Chemical and Petroleum Engineering*, 1995, 31(5-6): pp. 295-306.

Snyder et al., "Thermoelectric efficiency and compatibility," *Physical Review Letters*, Oct. 2003, 91(14): 148301(4).

TE Technology, Inc., FAQ's & Technical Information [online], 2010. Retrieved from the Internet <URL: http://www.tetech.com/FAQ-Technical-Information.html>.

U.S. Department of Energy, *Energy Efficient and Renewable Energy, 2009 Buildings Energy Data Book*, Oct. 2009, D&R International, Ltd.

Westphalen et al., "Energy consumption characteristics of commercial building HVAC systems. vol. 1: Chillers, Refrigerant Compressors, and Heating Systems," Arthur D. Little, Inc. Report for Office of Building Technology, State and Community Programs, U.S. Department of Energy, Apr. 2001.

Otsuka et al., Shape Memory Materials, Cambridge University Press, Cambridge, 1998, pp. 174-177.

Picornell et al., "Stress-temperature relationship in compression mode in Cu—Al—Ni shape memory alloys," Materials Transactions, 2004, 45(5): pp. 1679-1683.

(56) References Cited

OTHER PUBLICATIONS

Smith et al., "The heat capacity of solid Ni—Ti alloys in the temperature range 120 to 80 K," Journal of Phase Equilibria, 1993, 14(4): pp. 494-500.

* cited by examiner

FIG. 8A  Pre-assembled state without bias
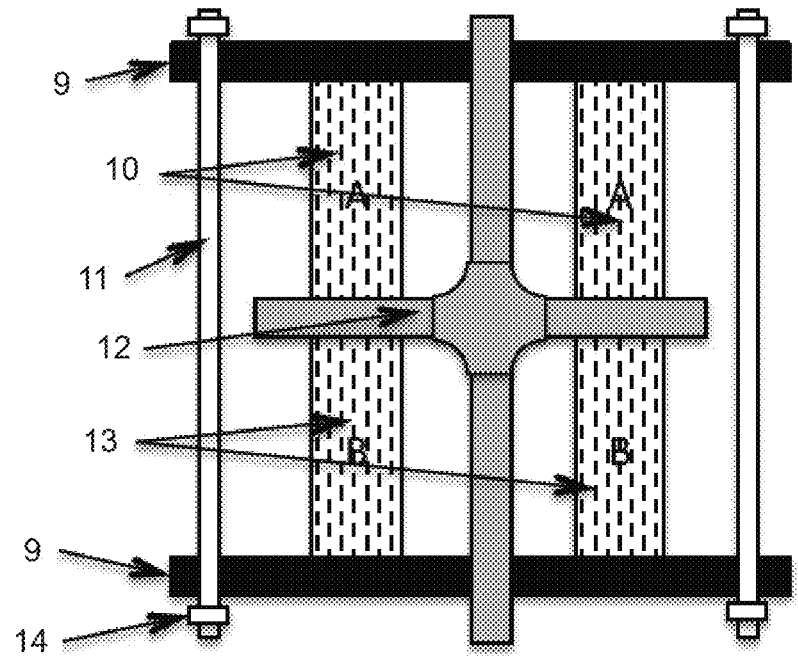
FIG. 8B  Assembled state with biasing compression
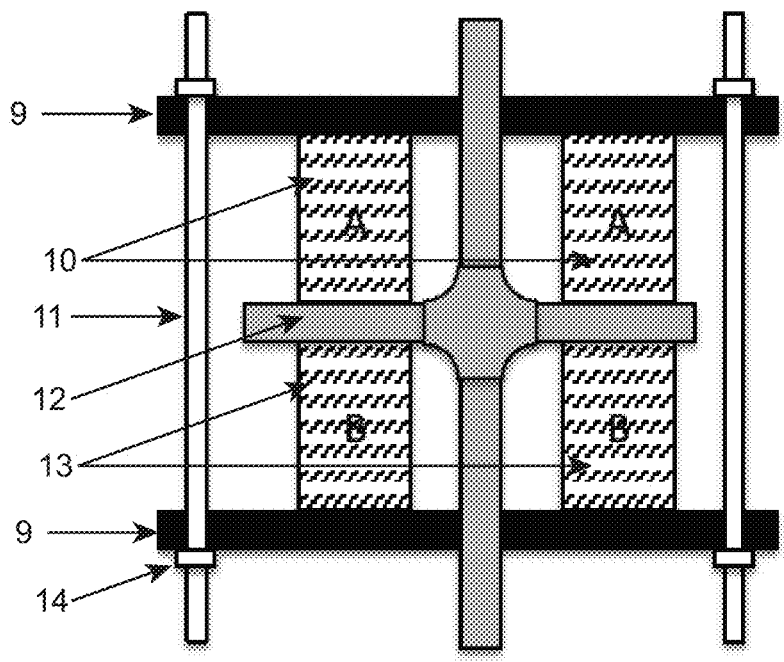

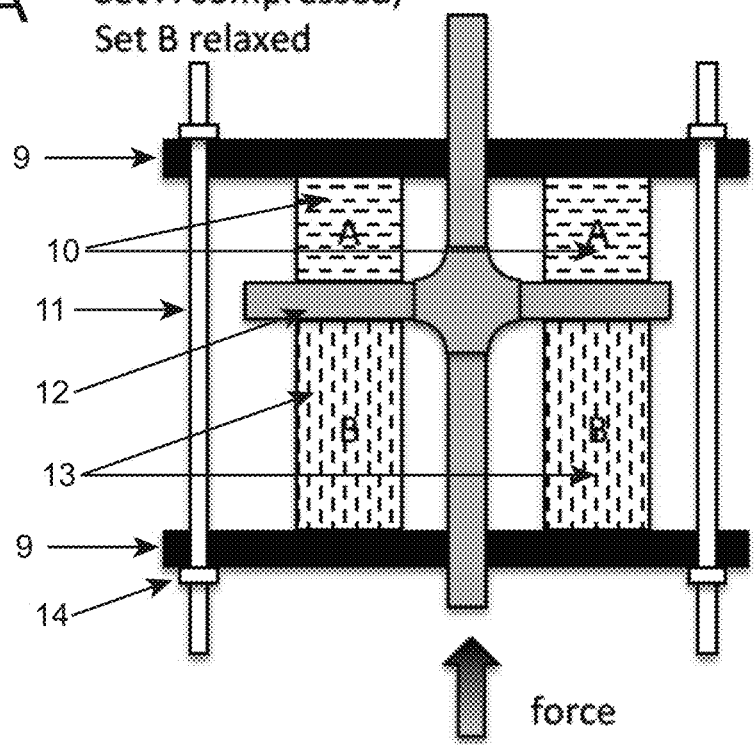
FIG. 9A  Set A compressed; Set B relaxed
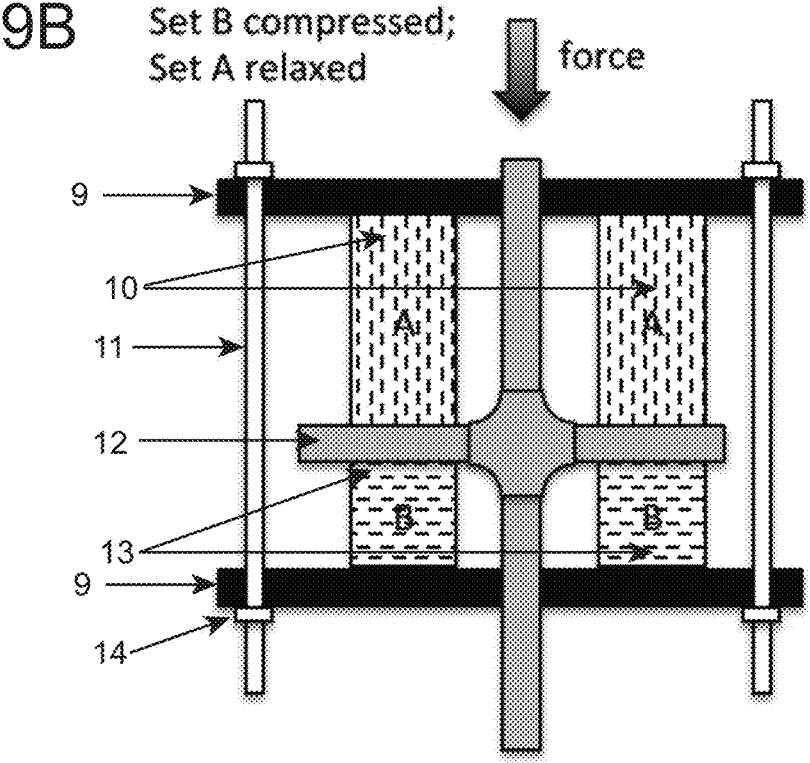
FIG. 9B  Set B compressed; Set A relaxed

THERMOELASTIC COOLING

CROSS-REFERENCE TO RELATED APPLICATIONS

The present application is a divisional application of U.S. application Ser. No. 13/431,768, filed Mar. 27, 2012, and claims the benefit of U.S. Provisional Application Nos. 61/474,172 and 61/550,866, filed Apr. 11, 2011 and Oct. 24, 2011, respectively, all of which are hereby incorporated by reference in their entireties.

STATEMENT REGARDING FEDERALLY SPONSORED RESEARCH

This invention was made with government support under DMR0520471 awarded by NSF, W911NF0710410 awarded by ARO, and DEAR0000131 awarded by DOE ARPA-E. The government has certain rights in the invention.

FIELD

The invention relates to systems and materials used for solid-state thermodynamic heat pump cycles or refrigeration cycles. More particularly, the invention relates to solid-state thermodynamic heat pump cycles or refrigeration cycles based on thermoelastic effect.

BACKGROUND

According to 2008 Buildings Energy Data, building space cooling and commercial and residential refrigeration will consume 7.46 quads of primary electricity and generate 447 million metric tons (MMT) of $CO_2$ emission in 2030. (Buildings Energy Data Book, 2009, at Table 1.1.7 and Table 1.4.5). This is equivalent to ~5% of primary energy consumption and ~5% of $CO_2$ emissions in US. Currently, more than 90% of space cooling in the US is provided by vapor compression (VC) based systems. (D. Westphalen and S. Koszalinski, Energy Consumption Characteristics of Commercial Building HVAC Systems, Vol. 1: Chillers, Refrigerant Compressors and Heating Systems; Arthur D. Little, Report For Office of Building Technology State and Community Programs, Department of Energy). Refrigerants used in VC systems are significant sources of greenhouse gas (GHG) emissions. Refrigerants such as hydrochlorofluorocarbons (HCFC) or halofluorocarbons (HFC) have global warming potential (GWP) as high as 1000 times that of $CO_2$. (See Buildings Energy Data Book, 2009). As such, there is an urgent need to develop a new and affordable cooling technology, which enhances overall energy efficiencies and reduces GHG emission in space cooling and refrigeration.

In addition to building space cooling and refrigeration, transport space cooling and refrigeration, and instrument temperature control also need new and affordable cooling technology, which enhances overall energy efficiencies and reduces GHG emissions.

There exist a number of refrigeration technologies. Currently, vapor compression is the dominant technology. More than 90% of cooling is provided by vapor compression based systems in U.S. (See D. Westphalen and S. Koszalinski, *Energy Consumption Characteristics of Commercial Building HVAC Systems*, Vol. 1, supra). A new technology that is more energy efficient and environmentally friendly is urgently needed to replace the vapor compression technology. Candidate technologies include electrocaloric, magnetocaloric, thermoacoustic, thermoelectric and thermoelastic. Table 1 briefly compares these cooling technologies.

TABLE 1

Comparison of various cooling technologies.

| Technology | Principle | Overall System COP | Environmental Impact | Cost | Reference |
|---|---|---|---|---|---|
| Vapor compression | Vaporization latent heat | 4 | High | Low | V. Pecharsky, K. Gschneider, Jr., PRL 78, 4494 (1997) |
| Electrocaloric | Electrocaloric effect | — | Low | High | Y. V. Sinyayskii, Chem. and Petrol. Eng., Vol. 31, p. 295, n5-6 (1995); A. S. Mischenko, Q. Zhang et. al., Science, Vol. 311, pp. 1270-71, n5765 (2006); Neese, Chu, et al., Science, Vol. 321, p. 821, n5890 (2008) |
| Magnetocaloric | Magnetocaloric effect | 15 | Low | High | K. Gschneider, V. Pecharsky, Annu. Rev. Mater. Sci., 2000, v. 30, pp. 387-429; J. L. Hall, J. A. Barclay, Advance Cryo. Eng., Vol. 43, pp. 1719-1728 (1998); K. Gschneider, et al., Proceedings $50^{th}$ Annual Int'l Applicance Tech., pp. 144-154 (1999) |
| Thermoacoustic | Ideal gas law | 0.8 | Low | Med | L. Garrett, Am. J. Phys. Vol. 72, pp. 11-17, n.1 (2004); A. Bejan, Adva. Eng. Thermodynamics (Wiley, N.Y. $2^{nd}$ ed., 1997); S. Backhaus, G. W. Swift, Nature, Vol. 399, pp. 335-338 (1999) |
| Thermoelectric | Peltier effect | 0.7 | Low | Med | TE Technology, Inc., http://www.tetech.com/techinfo; D. S. Kim, C. A. Infante Ferreira, Int'l J. Refg., Vol. 31, pp. 3-15, n. 1 (2008); G. J. Snyder, T. S. Ursell, Physical Review Letters, Vol. 91, pp. |

TABLE 1-continued

Comparison of various cooling technologies.

| Technology | Principle | Overall System COP | Environmental Impact | Cost | Reference |
|---|---|---|---|---|---|
| Thermoelastic | Martensitic phase transformation latent heat | 12.5 | Low | Low | 148301-4, n. 14 (2003) P. H. Leo, T. W. Shield, O. P. Bruno, Acta Metall. Materil., Vol. 41, No. 8, pp. 2477-2485 (1993) |

Vapor-compression refrigeration has been and still is the most widely used method for air-conditioners and refrigerators. The method relies on latent heat released or absorbed during pressure induced gas-liquid transition. Since its invention in 1805 by Oliver Evans, the efficiency of this technology has been significantly improved. Compared to the refrigerator built in 1970's, current Energy Star rated refrigerators use nearly 3 times less electricity. The compressor is frequently the first target for manufacturers looking to improve power consumption in their products. As a result of decades of effort, current compressors are highly efficient (~60%) and cost-effective. Adding other minor improvements such as seals, valves, muffler, heat exchangers, and thermal insulation, a modern refrigerator can be as efficient as 45%. However, to achieve more than incremental gain in efficiency, a fundamental change must be explored. In addition to the efficiency plateau, vapor-compression technology also faces adverse environmental circumstances due to its dependence on hydrochloroflurocarbons or halofluorocarbons refrigerants, of which the global warming potential is typically more than 1000 times that of $CO_2$. (See http://www.whitehouse.gov/administration/eop/nec/StrategyforAmericanInnovation; see also Buildings Energy Data Book, 2009). Even though the cost of manufacturing vapor-compression based air-conditioners and refrigerators is low, the efficiency limit and environmental issues make this technology undesirable.

Electrocaloric effect is not commercially exploited as the effect is insufficient for practical application. Recently, the technology received renewed interest because of two papers published in the Science journal, both of which demonstrated a giant electrocaloric effect. (A. S. Mischenko, Q. Zhang et al., Science, Vol. 311, pp. 1270-71, n5765 (2006); Neese, Chu, et al., Science, Vol. 321, p. 821, n5890 (2008)). In one paper, Mischenko shows that a thin film $Pb(Zr_{0.95}Ti_{0.05})O_3$ exhibits a $\Delta T$ of 12 K and $\Delta S$ of 8 J/(kg-K) with electric field of 480 kV/cm at 499 K. In the other paper, Neese shows that copolymer P(VDF-TrFE) film exhibits a $\Delta T$ of 12 K and $\Delta S$ of 55 J/(kg-K) with electric field of 300 kV/cm at 343K. While these findings are exciting and have the potential to open a new field of research, their commercial potential remains low because thin film forms (350 nm for the ceramic and 2000 nm for the co-polymer) present limitation on cooling capacity, and low thermal conductivity of the ceramic and polymer materials seriously impedes heat exchange efficiency. Various designs had been proposed to overcome the capacity limitation. But given the characteristic of the device, this technology is more suitable for spot cooling where space is at premium and high efficiency is secondary.

Magnetocaloric refrigeration has received substantial interest recently. The number of research papers in this area has increased exponentially in the past decade. Magnetocaloric refrigeration relies on the magnetocaloric effect, where reversible temperature change is caused by the application and removal of a magnetic field. The effect was discovered by Emil Warburg in 1881. Its theoretical Carnot efficiency approaches 68%. But, efforts to commercialize current magnetic refrigeration technology have been ineffectual due to the high cost implicated by its fundamental requirement of large quantity of rare-earth elements for working materials and for the magnetic field. Researchers have investigated the commercial viability of the current magnetic refrigeration technology, and concluded that a minimum 10× reduction in cost is required to achieve commercial feasibility. Most researchers are aware of the cost issues. Their focus has been on materials development, either trying to find new materials containing less expensive elements, or trying to increase the cooling capacity to improve the dollar/watt ratio. Fundamental research efforts typically do not address the cost issue associated with the requirement of large magnetic field. This is because the physics of magnetocaloric effect dictates that the cooling capacity is proportional to the applied magnetic field. It is estimated that for every 1 kg of rare earth based refrigerant materials, 6 kg of rare earth based permanent magnet is needed to supply the minimum required magnetic field. Hence, the strong dependence on rare earth materials limits the commercial viability of this technology.

Thermoacoustic refrigeration can be traced back to 1887, when Lord Rayleigh discussed the possibility of pumping heat with sound. The method relies on the ideal gas law, where high amplitude sound waves are applied to a pressurized gas to pump heat. The most efficient device built to date has an efficiency approaching 40% of the Carnot limit, or about 20~30% of the overall system efficiency. Despite significant progress achieved in the past decades, the commercial viability of the current thermoacoustic technology remains low.

Thermoelectric refrigeration is commonly used in camping and portable coolers and for cooling electronic component and small instruments. The method relies on the Peltier effect, the caloric effect of an electrical current at the junction of two dissimilar metals. The thermoelectric effect was discovered by Jean-Charles Peltier in 1834. The efficiency of a thermoelectric junction is low from 5~10%. Despite its compactness, applications are limited to small scales due to the low efficiency. The impact to the modern energy shortage and global warming is small.

SUMMARY

The present invention is directed to a regenerator for a heat exchange system and to a cooling system and a heat exchange system based on thermoelastic principles which addresses the need for new cooling technology that is cost effective, highly efficient, and environmentally friendly. The present invention discloses a system that places the process of relaxing the working material inside the refrigerated space such that all cooling capacity of the working material is utilized and the present discloses a system that utilizes the unload energy which may double refrigerant COP.

To achieve these and other advantages and in accordance with the purpose of the present invention, as embodied and broadly described, an embodiment is a thermoelastic cooling system comprising a heat sink, a refrigerated space, and a regenerator connected to the refrigerated space and to the heat sink such that the regenerator pumps heat from the refrigerated space to the heat sink, wherein the regenerator comprises solid refrigerant materials capable of exhibiting thermoelastic effect. In one embodiment of the invention, the regenerator is connected to the refrigerated space and the heat sink through direct contact. In another embodiment of the invention, the regenerator is connected to the refrigerated space and the heat sink through circulation of heat exchange media.

In another aspect, the present invention provides a cooling system, including a heat sink; a refrigerated space; and a regenerator coupled to the refrigerated space and to the heat sink, the regenerator including a thermoelastic material having an austenite phase and a martensite phase, the thermoelastic material undergoing a phase transition from the austenite phase to the martensite phase, releasing latent heat, when mechanically stressed, and undergoing a phase transition from the martensite phase to the austenite phase, absorbing latent heat, when relaxed from the mechanically stressed state, wherein the regenerator causes the thermoelastic material to be thermally coupled with the heat sink when the thermoelastic material is mechanically stressed and releasing the latent heat, thereby heating the heat sink, and wherein the regenerator causes the thermoelastic material to be thermally coupled with the refrigerated space when the thermoelastic material is relaxed and absorbing the latent heat, thereby cooling the refrigerated space.

In another aspect, the present invention provides a cooling system, including a heat sink; a refrigeration space; and a regenerator including: a thermoelastic material having an austenite phase and a martensite phase, the thermoelastic material undergoing a phase transition from the austenite phase to the martensite phase, releasing latent heat, when mechanically stressed, and undergoing a phase transition from the martensite phase to the austenite phase, absorbing latent heat, when relaxed from the mechanically stressed state, and stress and relax means for mechanically stressing the thermoelastic material to cause the phase transition from the austenite phase to the martensite phase to release the latent heat to the heat sink, the stress and relax means being also configured for relaxing the mechanically stressed thermoelastic material to cause the phase transition from the martensite phase to the austenite phase to absorb the latent heat from the refrigeration space.

In another aspect, the present invention provides a regenerator for use in a heat exchange system to extract heat from a refrigeration space and release heat to a heat sink, the regenerator including: a thermoelastic material having an austenite phase and a martensite phase, the thermoelastic material undergoing a phase transition from the austenite phase to the martensite phase, releasing latent heat, when mechanically stressed, and undergoing a phase transition from the martensite phase to the austenite phase, absorbing latent heat, when relaxed from the mechanically stressed state; and stress and relax means for mechanically stressing the thermoelastic material to cause the phase transition from the austenite phase to the martensite phase to release the latent heat from the thermoelastic material, the stress and relax means being also configured for relaxing the mechanically stressed thermoelastic material to cause the phase transition from the martensite phase to the austenite phase to absorb the latent heat.

Additional features and advantages of the invention will be set forth in the descriptions that follow and in part will be apparent from the description, or may be learned by practice of the invention by those of ordinary skill in the art. The objectives and other advantages of this invention that will be realized and attained by the device and method will be particularly pointed out in the written description and claims thereof as well as the appended drawings. It is to be understood that both the foregoing summary and the following detailed description are exemplary and included to provide a basic understanding of some aspects and features of the invention. They are not an extensive overview of the invention, nor are intended to particularly delineate the scope of the invention. Rather, they provide some concepts of the invention in a simplified manner as a further explanation of the invention as claimed.

BRIEF DESCRIPTION OF THE DRAWINGS

FIGS. 8A to 8B are schematics of a system with a dual compression thermoelastic cooling system.

FIGS. 9A to 9B are graphical representations of a dual compression thermoelastic system in operation.

DETAILED DESCRIPTION

Similar to the vapor compression cooling technology, the thermoelastic method relies on latent heat released or absorbed during the stress induced solid to solid phase transition. Test of the thermoelastic refrigerant has demonstrated cooling efficiency as high as 11.8. Low cost and the high manufacturability of this technology have the potential to transform refrigeration industry and deliver significant impact to both energy efficiency and the environment. The present invention addresses both the system designs and the working materials (refrigerants) for the cooling systems based on the thermoelastic effect.

Thermoelastic cooling effect is directly related to the reversible solid-to-solid martensitic phase transformation. In many ways, this concept is analogous to the conventional vapor compression technology because both use stress to induce phase transformations, and both utilize latent heat to achieve cooling. The difference lies in the form of the refrigerant. It is liquid/vapor for vapor compression, and solid/solid for thermoelastic cooling.

The reversible martensitic phase transformation is a diffusionless solid-to-solid transformation and involves crystallographic shearing deformation. The high-temperature phase (austenite) has higher symmetry than the low-temperature phase (martensite). The decrease of symmetry during the transformation results in the formation of multiple variants each with its own associated shape change. When the material is cooled to transform, all of the variants are equally likely to form. The randomly distributed variants leave the material with little change of its overall shape. When a stress is applied to this mixture of variants, certain variants will be energetically favored and appear in larger amounts than the others. The result is a significant change in shape as high as 10%. When the deformed martensite is warmed, the material transforms back to its austenitic configuration, which also restores the original shape of the alloy, acting as if it has a memory, thus the name of shape memory alloy (SMA).

Figure 1:
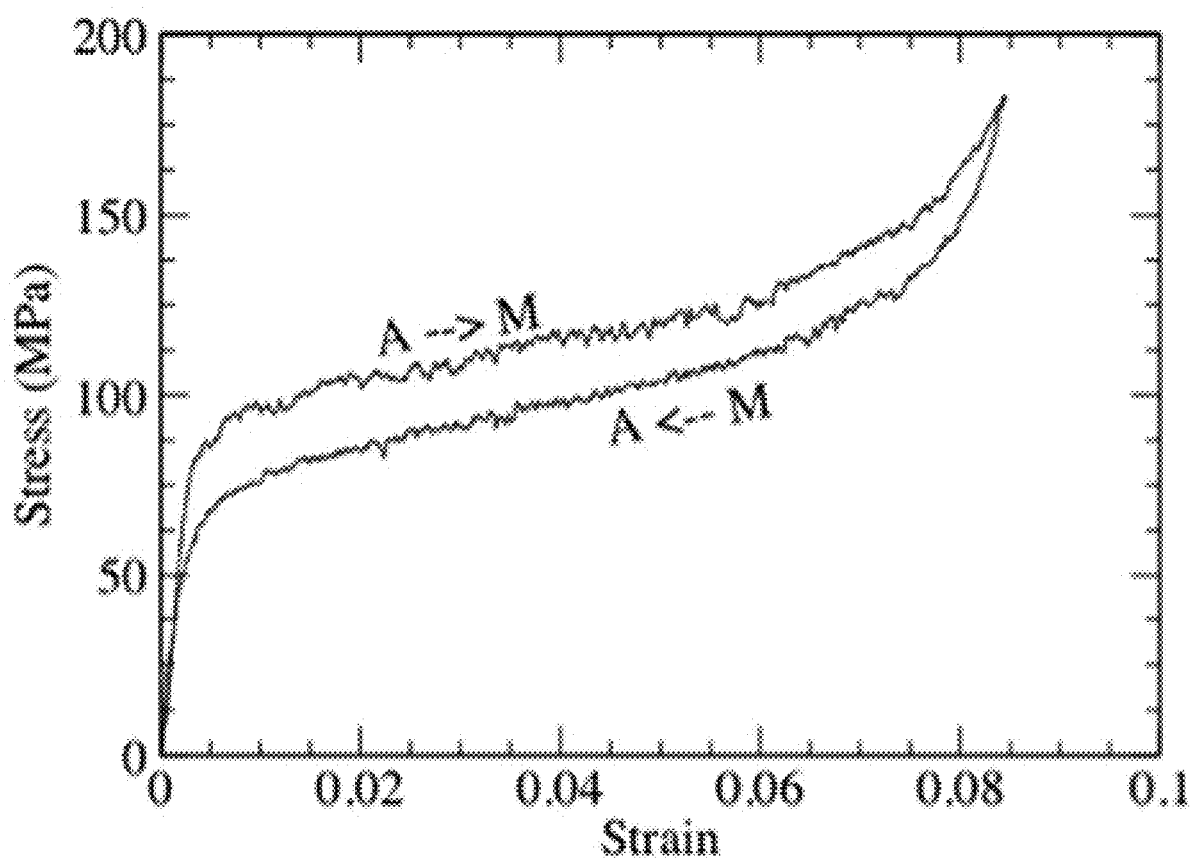
FIG. 1 is a graphical representation of stress-strain relations in a Cu—Al—Ni alloy.

In addition to temperature, a martensitic transformation can also be induced directly by stress. FIG. 1 depicts the process of stress-induced martensitic phase transformation in a CuAlNi alloy. At a temperature above the phase transformation, the material is in its austenite state (A), the stress-strain curve is steep, reflecting relatively high elastic constants. When the stress reaches certain magnitude, a martensite (M) starts to appear, and the material becomes soft. At this point, small increase of the stress results in a large amount of deformation (strain). The material remains soft till most austenite is transformed; then the material starts to recover its rigidity, and the stress-strain curve becomes steep again. The large deformation with the small increase of stress is known as super-elasticity.

Figure 2:
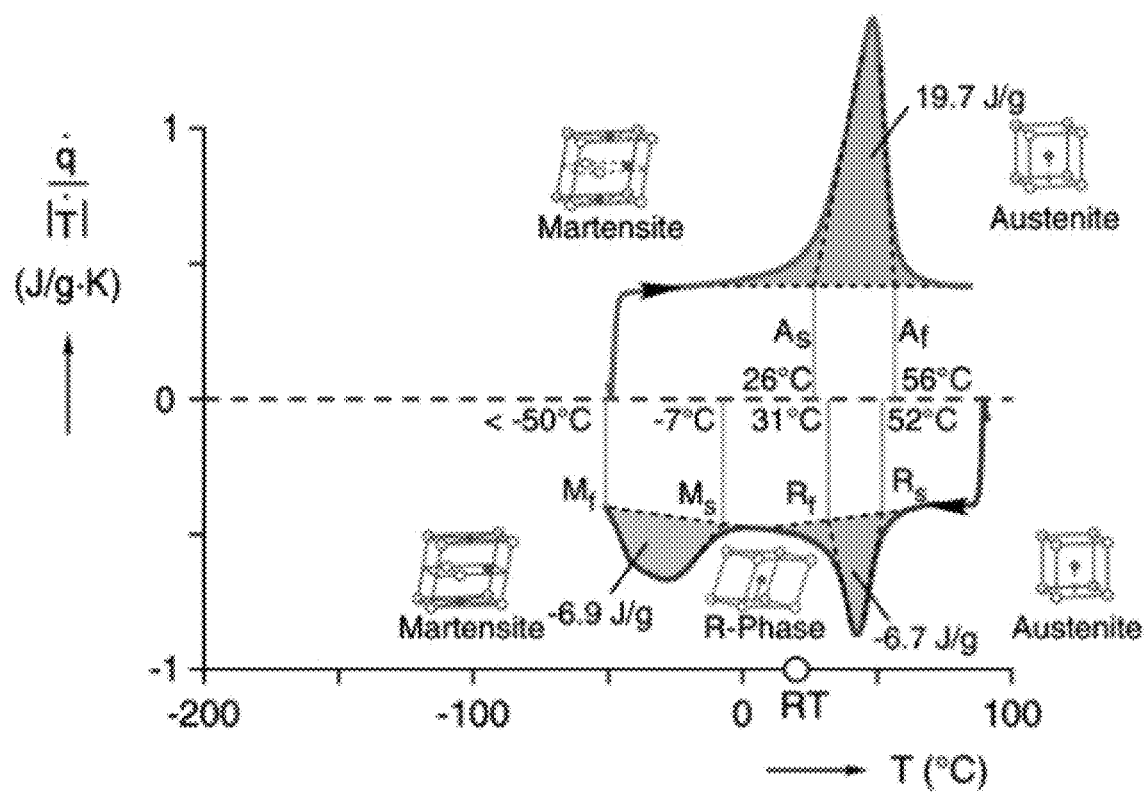
FIG. 2 is a graphical representation of the DSC curves of a NiTi alloy.

Currently, the most widely used shape memory alloy is Nitinol (Nickel Titanium Navy Ordnance Laboratory). It is a binary alloy serendipitously discovered in 1961, (G. B. Kauffman, I. Mayo, Chemical Educator, Vol. 2, No. 2, pp. 1-21 (1997); W. J. Buehler, Letter to Amy Axt Hanson, 15 Jun. 1991), and later understood through the dedicated work of F. E. Wang. Nitinol's austenite phase has an ordered cubic (B2) crystal structure; its martensite has an ordered monoclinic (B19') crystal structure; and it has another intermediate rhombohedral phase (B2') often referred to as the R phase. The latent heat of each transformation is shown in FIG. 2 (J. A. Shaw, et. al., Experimental Techniques, September/October pp. 55-62 (2008).

In addition to the shape memory alloys, there exist thermoelastic polymers that are capable of transforming from one solid phase to other solid phase, absorbing or releasing latent heat during the phase transformation. The transformation can be induced by temperature, stress, magnetic field, electric field, light, solution, or other forms of energy input. Example of the thermoelastic polymer include, but not limited to, polyurethanes, polyurethanes with ionic or mesogenic components made by prepolymer method, block copolymer of polyethylene terephthalate (PET) and polyethyleneoxide (PEO), block copolymers containing polystyrene and poly(1,4-butadiene), and an ABA triblock copolymer made from poly(2-methyl-2-oxazoline) and polytetrahydrofuran. Compared to thermoelastic metals as refrigerant, thermoelastic polymer is more cost effective, has longer service life, requires less critical stress; however, it has less thermal conductivity and less power density.

Figure 3:
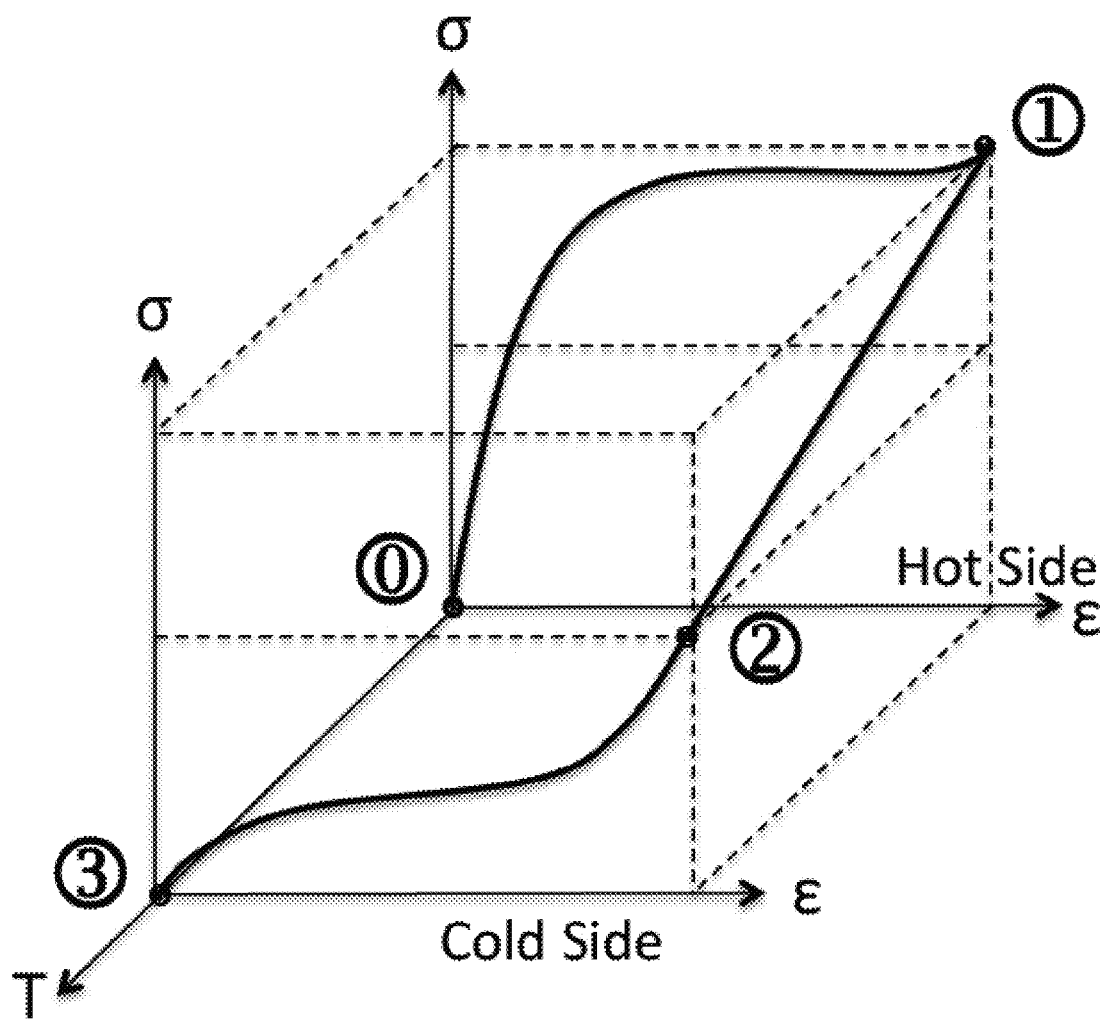
FIG. 3 is a schematic of thermoelastic cooling cycles.

The thermoelastic cooling effect can be best illustrated using a wire made of a shape memory alloy. When stressed with two hands, the wire is forced to transform to a martensite phase and releases 19.7 kJ/kg of latent heat. This amount of heat suffices to leave a burning sensation to the skin. Upon stress removal, the wire transforms back to its parent phase and absorbs similar amount of heat as a result. The loading path of this example, where pulling a SMA wire heats up the material, is depicted in FIG. 3. The wire is stressed from point ⓪ to ①. In this process, the wire transforms to the R phase releasing 6.7 kJ/kg of heat, and then transforms to the martensite phase releasing another 6.9 kJ/kg of heat. The wire becomes hot. In the next step, the wire is placed against a person's skin where the temperature is relatively cold. Stress remains constant. The path for this process is from point ① to ②. The final step is to unload the stress and absorb 19.7 kJ/kg of heat in the process. The person who previous feels the slight burning sensation now feels a freezing sensation. The path for this process is from point ② to ③.

Among the six major refrigeration technologies, only magnetocaloric and thermoelastic methods show significant impact on energy efficiency and the environment. Of these two methods, thermoelastic cooling promises to be more cost effective. In addition, compared to other five refrigeration technologies, thermoelastic cooling technology has several unique strengths including the fact that it requires no working fluid (so there are no leakage, toxicity, and flammability issues, and it is low maintenance) and that the working materials and application products have infinite shelf lives. The technology is also explosion proof and gravity independent, and can be engineered for any temperature operation. Thermoelastic cooling is capable of more than 20K temperature lift (thus, enabling sensible cooling), and has potentially high COP. These strengths make thermoelastic cooling technology particularly suitable among other things for the following applications: indoor dehumidifiers, small personal coolers (for hotel room refrigerators, wine coolers, and beverage coolers for automobiles), man-powered (hand-cranked) cooling systems (picnic coolers, exercise bicycles, beverage can coolers), thermoelastic stage in vapor compression systems, topping or bottoming cycle, harvesting vibrations for cooling (integrated in shock absorbers of automobiles for cooling), mechanical heat pipes, and cooling electronics. Other than air conditioning and refrigeration, the thermoelastic effect can also be extended to other applications indirectly related to cooling, such as power generation, waste heat utilization, ORC substitute, energy harvesting for sensors, and self-powdered devices (use ΔT to drive cooling fan).

The coefficient of performance (COP) of the thermoelastic cooling can be estimated based on the following conditions: 1) the latent heat absorbed during martensite to austenite transformation is independent of temperature; 2) The system energy loss for a typical VC system is about 40% of the energy required for inducing phase transformation. The total system COP is about 71% of the refrigerant COP. The system energy loss includes the energy loss to heat exchange, stress application, fans, mechanical frictions, electrical to mechanical conversion and thermal leaks, etc. For estimating purpose, the system energy loss for a thermoelastic cooling system is assumed to be the same as the one for a typical VC system; 3) the temperature of the refrigerated space is higher than the austenite finish temperature. This is to ensure the refrigerant, once removed from stress application, can be fully recovered to the austenite state. The refrigerant can only absorb most of the latent heat when it transforms from the most martensite state to the most austenite state.

For calculation purpose, we assume the refrigerant takes the form of a square plate ($0.1 \times 0.01 \times 0.01$ m$^3$). The density of Nitinol is 6450 kg/m$^3$. The latent heat absorbed during the martensite to austenite transition is 19.7 kJ/kg. For the square plate, assuming that the plate is fully transformed, the total heat absorbed is:

$$L = 19.7 \frac{kJ}{kg} \times 6450 \frac{kg}{m^3} \times 0.01 \text{ m} \times 0.1 \text{ m} \times 0.1 \text{ m} = 12.71 \text{ kJ}.$$

To estimate the energy required to stress the square plate into martensite, average stress of 270 MPa and average strain of 6% are assumed. The total mechanical energy required to complete the phase transformation for the square plate is:

$$W = 270 \times 6\% \times 10^6 \frac{N}{m^2} \times 0.01 \text{ m} \times 0.1 \text{ m} \times 0.1 \text{ m} = 1.62 \text{ kJ}.$$

The refrigerant COP, which is defined as the absorbed latent heat divided by the energy required for inducing the phase transformation, is equal to COP=L/W=12.71/1.62=7.84. If we apply the 2$^{nd}$ condition (system COP is 70% of refrigerant COP), the final system COP is 5.5. Compared to current state-of-art vapor compression technology (COP=4.5), this result represents 22% improvement.

The thermoelastic effect is a known effect that had been studied for several decades. While most of the efforts have been focused on the applications in the field of sensing and actuation, the potential of using the thermoelastic effect for cooling or refrigeration has also been explored. For example, U.S. Pat. No. 6,367,281 issued to Hugenroth attempts to describe the concept of thermoelastic cooling, and tried to disclose the refrigeration systems based on the thermoelastic effect. However, the system disclosed in the art has a low efficiency or may be inoperative because it places the refrigerated space in a location where the working material had been relaxed and the thermoelastic effect had already occurred. The working material can only effectively absorb or release latent heat during the phase transformation, not before or after. Therefore, as described and claimed in the present invention, the heat sink for the system to dump the latent heat preferably is placed where the working material is being stressed, and the refrigerated space preferably is placed where the working material is being relaxed, not before or after the working material is relaxed. If the refrigerated space is placed after the working material is relaxed, as disclosed in the U.S. Pat. No. 6,367,281, the thermal environment at which the working material is being relaxed from the stressed state must be adiabatic, such that during the phase transformation, the change of the Gibbs free energy of the working material is not compensated by the environment, i.e., not by absorbing any heat from the environment. Rather, the change of the Gibbs free energy is compensated by lowering the temperature of the working material itself. At this point, the temperature of the working material is lower than the temperature of the target refrigerated space so that when the cold working materials is subsequently in contact with the refrigerated space, heat exchange between the working material and the refrigerated space occurs, and the temperature of the refrigerated space is further lowered at the expense of the temperature increase of the working material. As such, the material recited in the claims of U.S. Pat. No. 6,367,281 must exhibit adiabatic temperature changes upon phase transitions in contrast to the present invention which utilizes shape memory alloy(s) that exhibit phase transitions with latent heat exchanges. It is believed that such materials (exhibiting adiabatic temperature changes upon phase transitions) presently do not exist. Another reason the systems disclosed in U.S. Pat. No. 6,367,281 have low efficiency is that unlike some of the embodiments of the present invention, they do not utilize the mechanical energy (unload energy) stored in the solid refrigerant materials.

Figure 4:
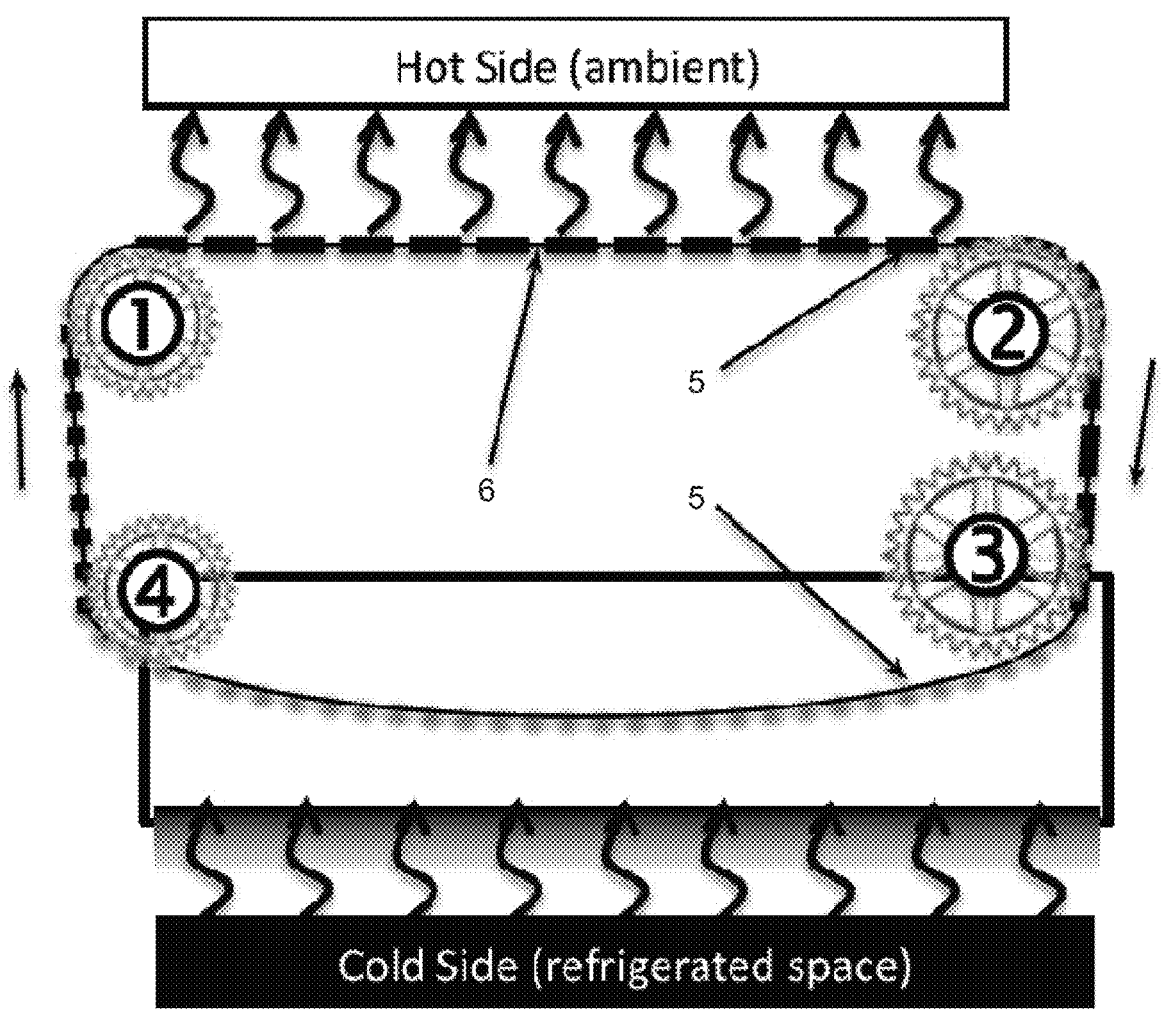
FIG. 4 is a schematic of a system with the refrigerant belt made of thermoelastic refrigerant blocks.

As described above, an embodiment of this invention is directed to a thermoelastic cooling system comprising a heat sink, a refrigerated space, and a regenerator connected to the refrigerated space and to the heat sink either through direct contact or through circulation of heat exchange media such that the regenerator pumps heat from the refrigerated space to the heat sink, wherein the regenerator comprises solid refrigerant materials capable of exhibiting thermoelastic effect. In particular, one embodiment of the invention is a thermoelastic cooling system that uses a set of gears to apply stress either directly to the solid refrigerant, or via a belt decorated with the solid refrigerant, as shown in FIG. 4. As depicted in FIG. 4, gears 1, 2, 3 and 4 apply stress via the drive belt 6 decorated with refrigerant plates 5, thereby pumping heat the cold side (refrigerated space) to the hot side (ambient or heat sink). In this particular embodiment, the use of the gear is distinctively different from a pulley or a drum because without gear teeth, the magnitude of the stress will not be sufficient to induce phase transformation for these blocks and plates made of the refrigerant to transform.

Figure 5:
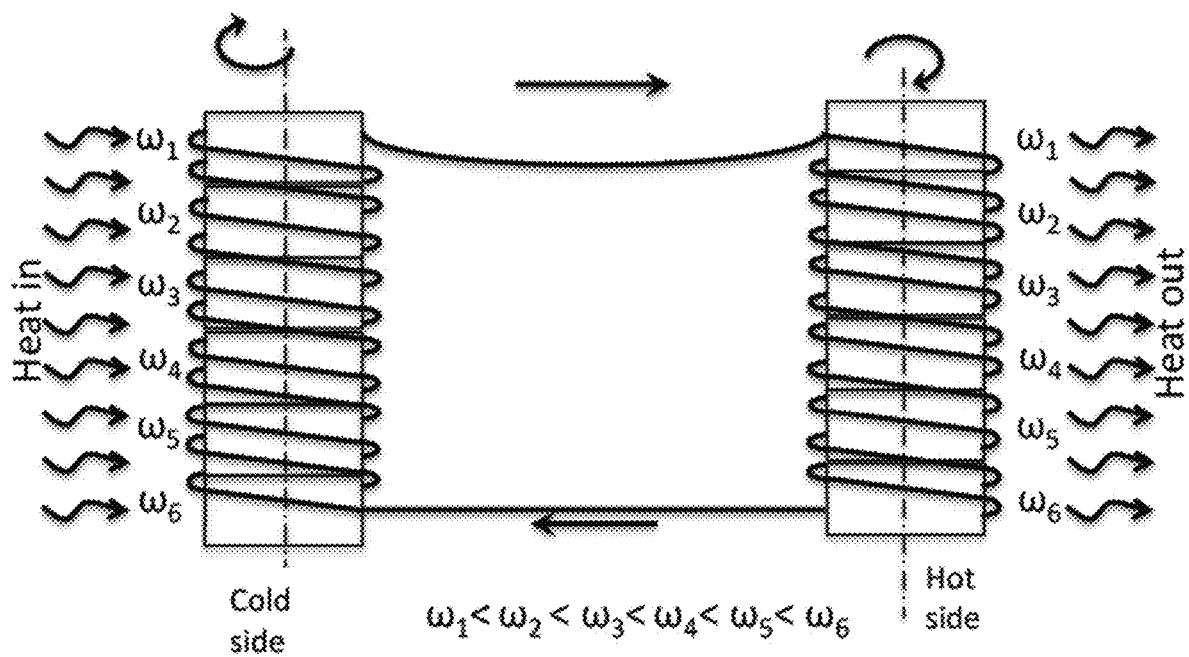
FIG. 5 is a schematic of a system with two drums with multiple sections rotating at various speeds.

FIG. 5 depicts a thermoelastic cooling system in accordance with another embodiment of this invention. The thermoelastic cooling system shown in FIG. 5 allows a continuous cycling of the working materials using multiple drums. Each drum consists of several sections. Each section of the drum rotates at different speed allowing the refrigerant wire to be stressed or un-stressed (relaxed) as it is wound onto the drum depending on the speed difference between the sections of the drums. For example, if the speeds of rotation of the sections of the drum are increasing as the wire is wound onto the drum, the wire will be stressed. On the other hand, if the speeds of the rotation of the sections of the drum are decreasing as the wire is wound on to the drum, the wire will be relaxed. The large surface area of the drum allows effective heat exchange. In this embodiment, two drums with multiple sections are used. One is placed at hot side where heat exchange with ambient environment occurs, and the other one is placed at the cold side where the heat exchange with the target cooling space occurs. The key feature of this embodiment is the integration of the stress application with the heat exchange function in one location, the drum.

Figure 6:
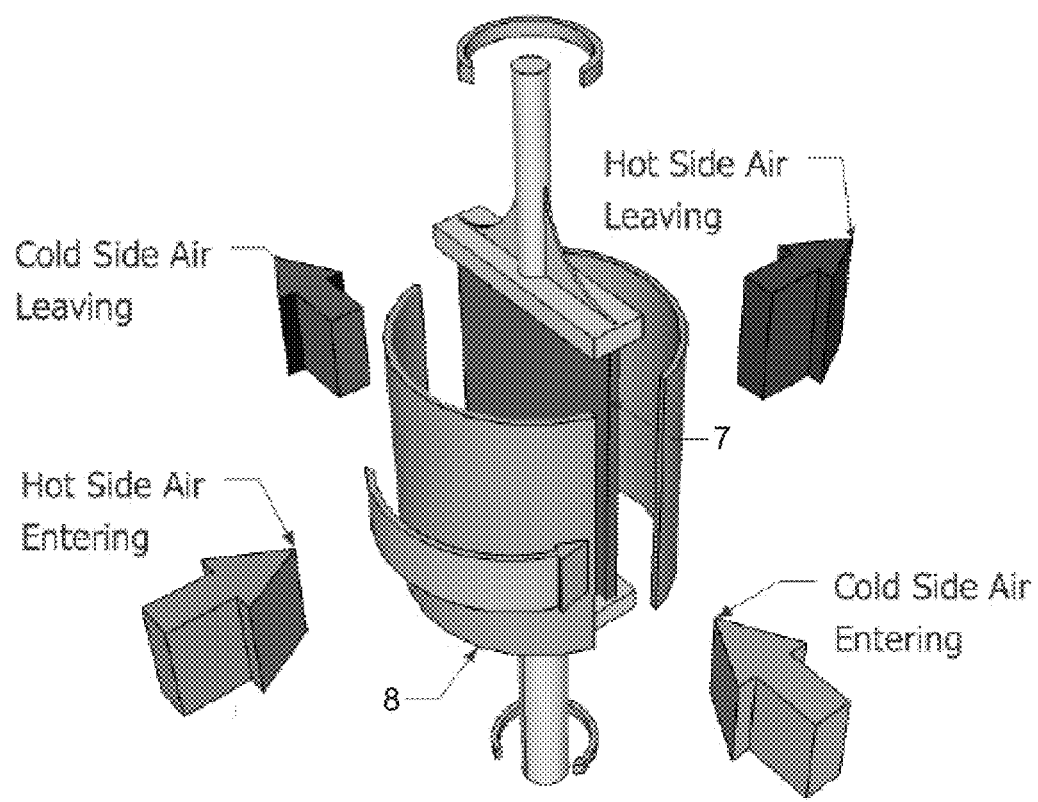
FIG. 6 is a schematic of a system with a thermoelastic regenerator plate and stress application apparatus.

In another embodiment of this invention, a thermoelastic cooling system comprising a regenerator plate and a stress application apparatus are disclosed. FIG. 6 is a sketch of the regenerator. It primarily consists of a regenerator plate 7 composed of a NiTi alloy, a set of torsion stress applicator, a rotating heat flow alternator 8 and fans. Other materials as described suitable in the present application also can be used for the regenerator plate 7. This particular embodiment of the thermoelastic cooling system allows a single plate or a plurality of plates to be stressed with torsional force. A complete cooling cycle consists of four steps as follows: (1) shear stress is applied to the regenerator plate 7 releasing latent heat; (2) hot air is introduced to the regenerator plate to discharge the heat to the hot air from the regenerator plate and exhaust the air to outdoor; (3) once the temperature is equilibrated, the hot side loop is closed, and cold side air introduced; and (4) the stress is removed and the plate is allowed to transform back to austenite, absorbing heat from the cold side air. In a preferred embodiment, sensors are used to monitor the energy consumption and the cooling load. The system shown in FIG. 6 requires less energy to induce the same phase transformation thus promising higher energy efficiency.

Figure 7A:
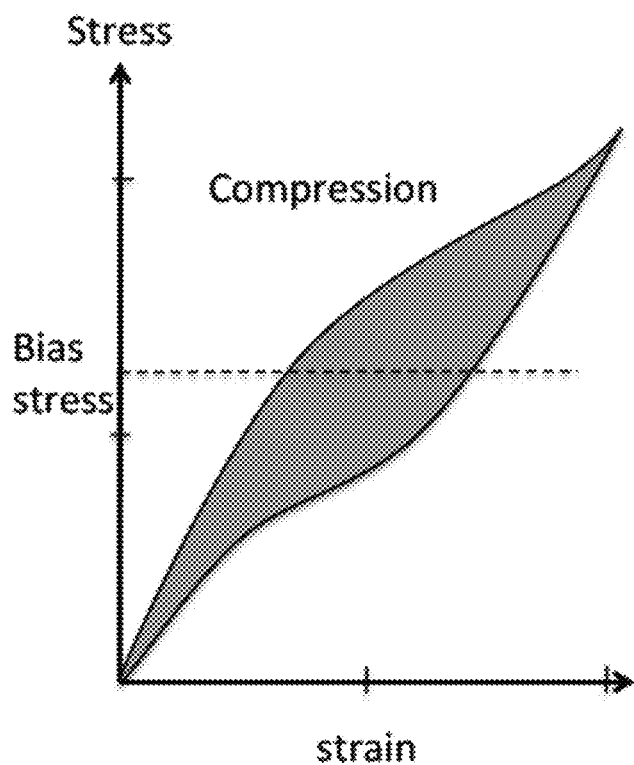
FIGS. 7A to 7B are graphical representations of the stress strain curves of a NiTi alloy.
Figure 7B:
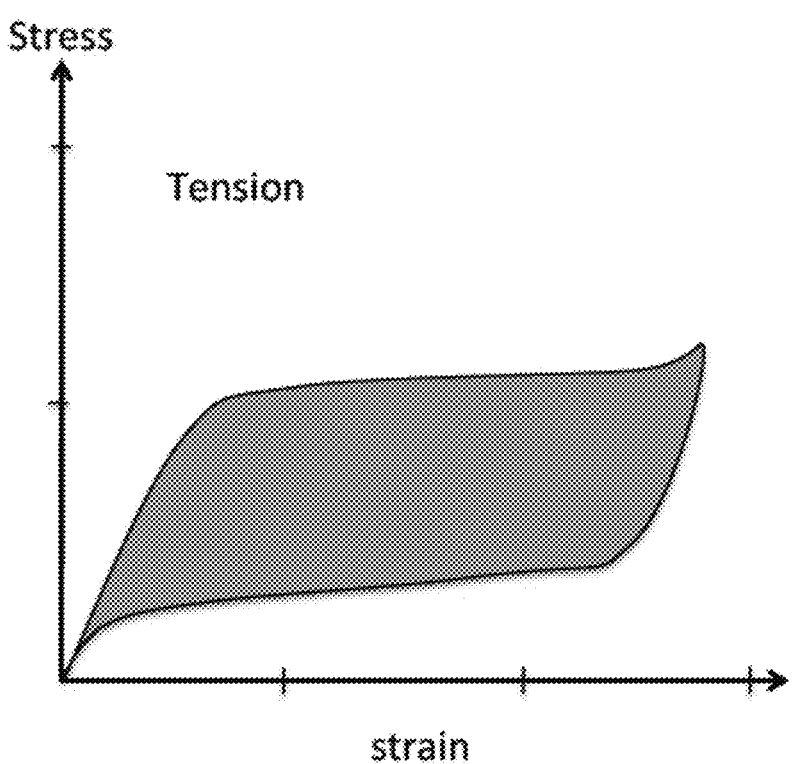

Another embodiment of the invention discloses a thermoelastic cooling system utilizing dual compression mechanism, which allows the system to recover the part of the energy spent on compressing the refrigerant, as shown in FIGS. 8A and 8B. FIG. 8A depicts a cross-sectional view of the thermoelastic cooling system in a pre-assembled state without bias showing the end plates 9, refrigerant set A 10 and set B 13, the holding rod 11, the loading cross 12 and the biasing nut 14 which appear loosened. FIG. 8B is also a cross-sectional view which shows the assembled state with the same parts as FIG. 8A but with biasing compression depicted by the tightened biasing nut 14. Refrigerant set A 10 and refrigerant set B 13 in this system are composed of materials such as NiTi alloys, CuAlNi, CuZnNi, CuZnAl, FePd, AuCd, NiMnGa, and FeMn alloys with adjusted heat treatment profile, or with additives such as C, H, or other transition metals, as well as derivatives of the above described alloys. In such a dual compression mechanism, when refrigerant A is under compression, refrigerant B is relaxed, and vice versa. The goal of the system is to utilize the unload energy to improve the overall energy efficiency. Such a dual compression mechanism system is based on the stress-strain curves shown in FIGS. 7A and 7B. In the initial stage, refrigerant set A 10 and refrigerant set B 13 are both compressed to the point that both sets are in the middle of phase transformation. The stress level is shown by the dash line in FIG. 7A. When the loading cross 12 is pushed against refrigerant set A 10, as shown in the cross-sectional view of the system shown in FIG. 9A, refrigerant set A 10 is fully transformed to martensite releasing latent heat, while refrigerant set B 13 is fully transformed back to austenite with absorbed latent heat. When the loading cross is pushed toward refrigerant set B 13, as depicted in the cross-sectional view shown in FIG. 9B, the refrigerant set A 10 will be relaxed transforming to austenite absorbing latent heat and refrigerant set B 13 will be stressed to martensite releasing latent heat. Heat exchange media may be synchronized with the loading cross 12 action to either dump the generated heat to media which will subsequently dump to the ambient or to cool down the heat exchange media which will subsequently cool down the target space. The overall energy spent in the dual compression system is the area enveloped by the stress-strain hysteresis loop, as shown by the shaded area in FIGS. 7A and 7B. Test results show that the energy required for operating a dual compression system is only 30% of the single compression system. And the energy required for operating a dual compression system is only 25% of the dual tension system.

Figure 10A:
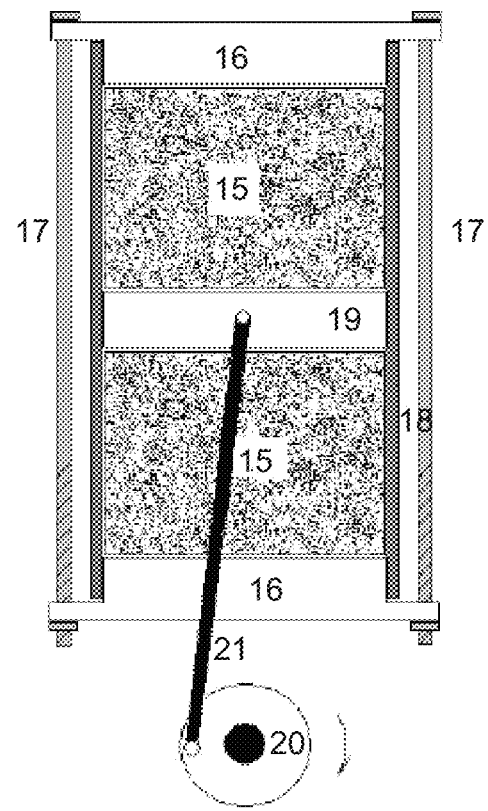
FIGS. 10A to 10B are graphical representations of a thermoelastic cooling system using piston compression design.
Figure 10B:
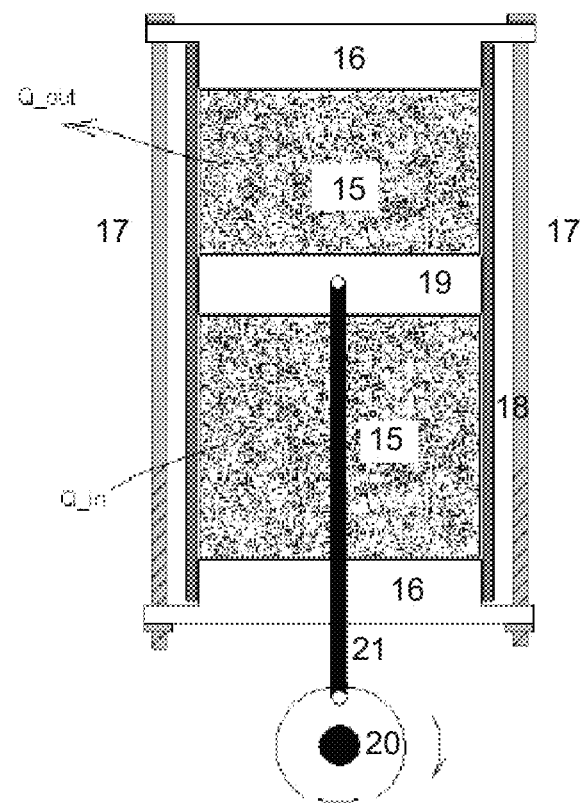

FIGS. 10A and 10B depict cross-sectional views of a simplified dual compression system driven by a piston. As shown in FIGS. 10A and 10B, the main parts of the piston compression design are thermoelastic material units 15 with same volumes, end-holding plates 16, compression pre-load screws 17, outside wall 18, two-way movement piston 19 that air-seal with the wall 18, driving wheel 20 and driving shaft 21. Before operation, both thermoelastic material units 15 will be pre-compressed to 50% of maximum designed deformation by the end-holding plates 16 and compression pre-load screws 17. Because of the balanced forces from both material units, the piston will stay at the middle position, at which time, both materials will have two solid state phases. During operation, at the first 90° rotation of the driving wheel 20, the piston will be pushed up and down by the driving wheel 20 through driving shaft 21. When the piston reaches the top point, or half travel distance, the top thermoelastic material units 15 will be 100% compressed and totally induced and transformed to one solid state phase (martensite) releasing partial latent heat (Q_heat) to the working medium. At the same time, the bottom thermoelastic material units 15 will be 100% released and fully transformed to the other phase (austenite) absorbing partial latent heat (Q_in). Then, at the subsequent 180° rotation position, when the piston reaches the bottom point or full travel distance, the top thermoelastic material units 15 will be fully released and phase transformed to austenite, thereby absorbing heat, and the bottom thermoelastic material units 15 will be fully compressed and phase transformed to martensite, thereby releasing the latent heat. In each 360° rotation after this, both thermoelastic material units 15 will release latent heat once and absorb once. While the materials are under compression, they have potential energy which pushes back on the piston, so that their compression is released. Hence, the mechanical energy used to load or compress the thermoelastic materials is, in turn, used to drive the mechanism, which constitutes recovery of the mechanical energy during the releasing process in each cycle for each material. Suitable thermoelastic materials for the piston compression design are 3-D SMA materials. To ensure better heat exchange, open-cell porous materials or bundled up wires should be used for the thermoelastic material units with same volumes as thermoelastic material units 15.

Figure 11A:
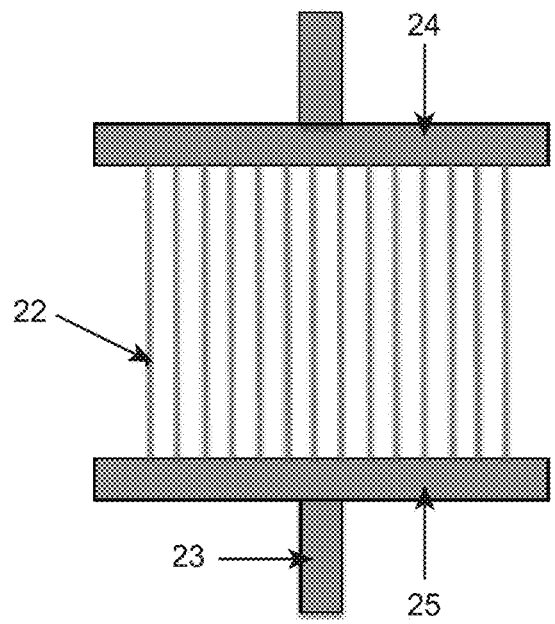
FIGS. 11A to 11B are graphical representations of a thermoelastic cooling system using bird-cage design.
Figure 11B:
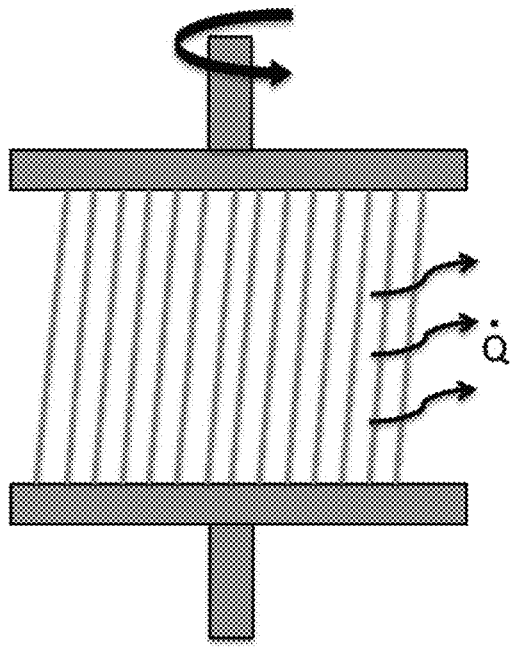
Figure 12:
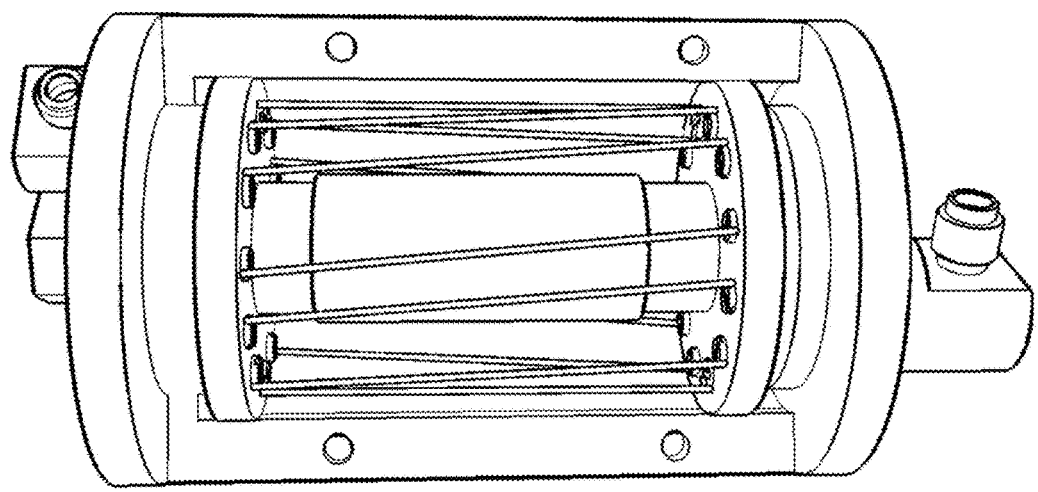
FIG. 12 is a picture of a 35 watt man-powdered bird-cage thermoelastic cooler.

Another embodiment of the invention is a thermoelastic cooling system using bird-cage design as illustrated in FIGS. 11A and 11B. As shown in FIGS. 11A and 11B, the thermoelastic refrigerant wires 22 are extended by rotating the top torque plate 24 and the bottom torque plate 25 in opposite directions using the drive shaft 23 attached to two wheels and contained in a regenerator chamber. When the two plates 24, 25 are torqued, the thermoelastic refrigerant wires 22 are energized or stressed, and the latent heat is released. The generated heat is removed by circulating hot-side heat exchange media between the regenerator chamber and the heat sink (ambient). During the cooling step, the torque applied to the plates 24, 25 is released; the thermoelastic refrigerant wires 22 are relaxed and transformed back to the de-energized state. The wires absorb heat from the cold-side heat exchange media and cool it down. In a preferred embodiment, the thermoelastic refrigerant wires 22 are composed of NiTi. FIG. 12 shows the picture of a 35 watt man-powered bird-cage thermoelastic cooler. The refrigerant wires in the picture are in de-energized state. The heat sink and heat exchange media circuitry are not shown.

Figure 13A:
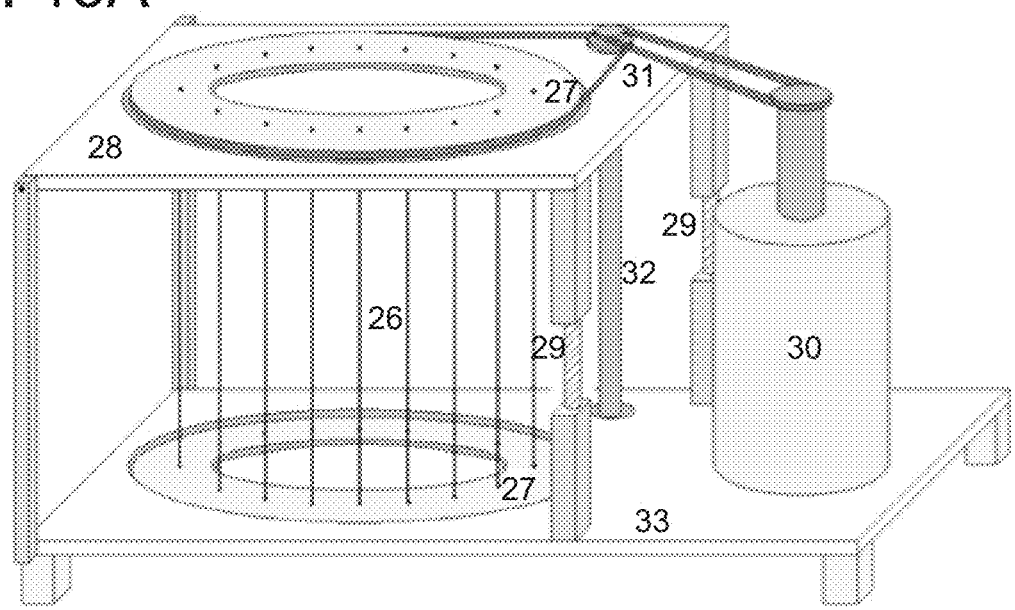
FIG. 13A is a graphical representation of a thermoelastic cooling system using Rotating Birdcage Double-Ring-Pulling design.
Figure 13B:
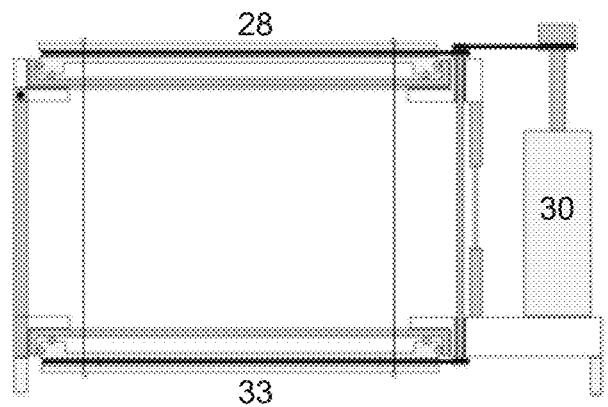
FIG. 13B depicts the cross-sectional view of the mechanical part of the initial state.
Figure 13C:
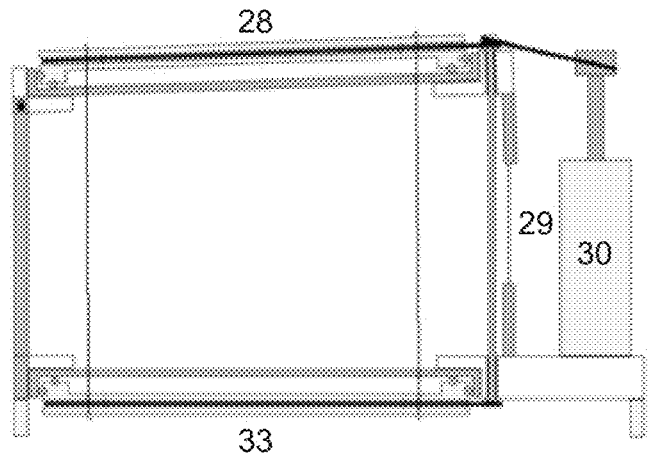
FIG. 13C shows the cross sectional view of the state where one part of the cage is stretched during operation.
Figure 14A:
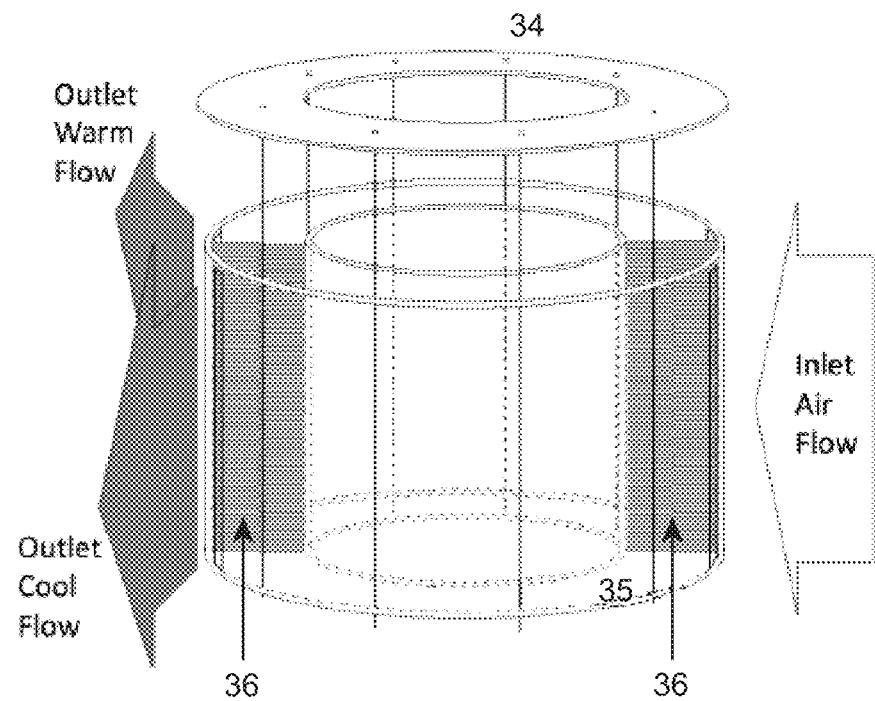
FIG. 14A is the air-flow schematic of the Rotating Birdcage Double-Ring-Pulling design.
Figure 14B:
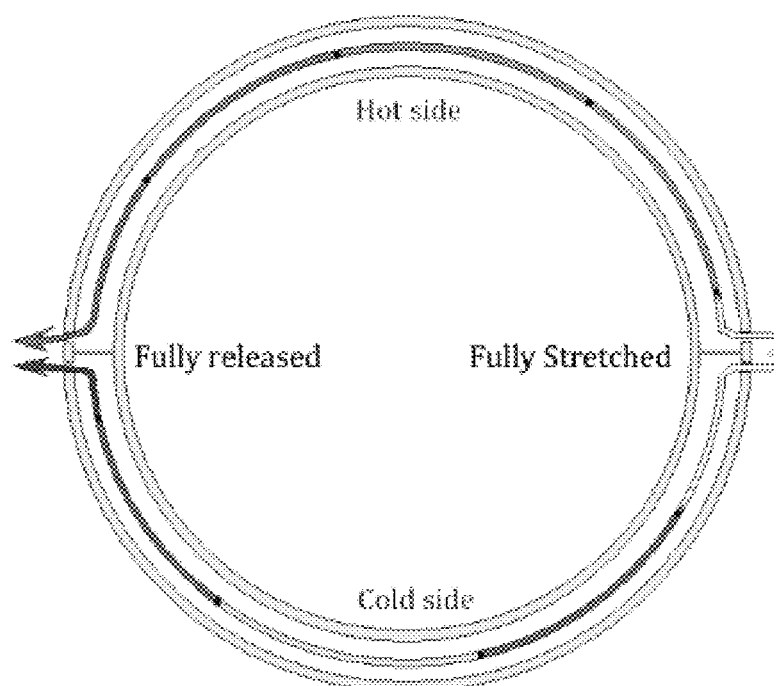
FIG. 14B depicts a top view of the air flow of the heating and cooling sides.

Another embodiment of the invention discloses a thermoelastic cooling system using a rotating bird-cage double-ring-pulling design. FIG. 13A illustrates the overall system design where the main parts are thermoelastic wires with same lengths 26, double-pulling rings 27 for pulling and releasing, the top plate 28 for supporting the top ring, height-adjustable screw bars 29 for designed strain application, the driving motor 30, pulleys and belts 31 and a shaft 32 for ring rotation drive that in turn pulls and releases the wires with a designed frequency, the bottom plate 33 for the bottom ring and other supporting parts. There are bearings between double-pulling rings 27 and supporting plates 28 and 33 for minimum friction during ring rotating. FIG. 13B shows a cross-sectional view of the mechanical part of the initial (static) state, and FIG. 13C shows the system in operation where the wires in one area of the cage are stretched and the wires in the other area are relaxed. In the initial state as shown in FIG. 13B, none of the wires are under stress and as such, there is no stress induced phase transition and thermoelastic behavior. As depicted in FIG. 13C, during operation, once the right side of the top wire-loading ring is lifted by the height-adjustable screw bars 29, the refrigerant wires rotated into this area will be stretched and transform to martensite releasing heat. As these wires rotate away from this area, their stress is released and the wires are relaxed and transform to the austenite state absorbing the latent heat, and thereby, cooling the medium. In other words, when the height-adjustable screw bars 29 are extended, the top plate 28 and the bottom plate 33 are no longer parallel, and the wires close to the extended height-adjustable screw bars 29 will be stretched while the wire in the opposite area will be relaxed, creating a hot zone and a cold zone. The key benefit of this design is that while the wires are under tension they have potential energy which induces the ring to rotate so that their tension is released, and the mechanical energy used to load the wires is, in turn, used to drive the mechanism. In other words, the mechanical energy stored in the stretched wires contributes to the total energy required to keep the ring rotating. This constitutes recovery of the unloading mechanical energy during the releasing process in each cycle for each wire. FIG. 14A illustrates the heat exchange sub-system that facilitates heat exchange between the wires and the working medium in the rotating birdcage double-ring-pulling design system. FIG. 14A shows the rings and wires 34, the thermal insulation walls 35 and the brash separators 36, which prevent the air in the hot side from mixing with the air in the cold side. FIG. 14B illustrates the top view of the same system showing the air flow of the heating and cooling sides. The design allows the hot-air side and the cold-air side to remain separated, which avoids unnecessary heat loss in media.

Figure 15:
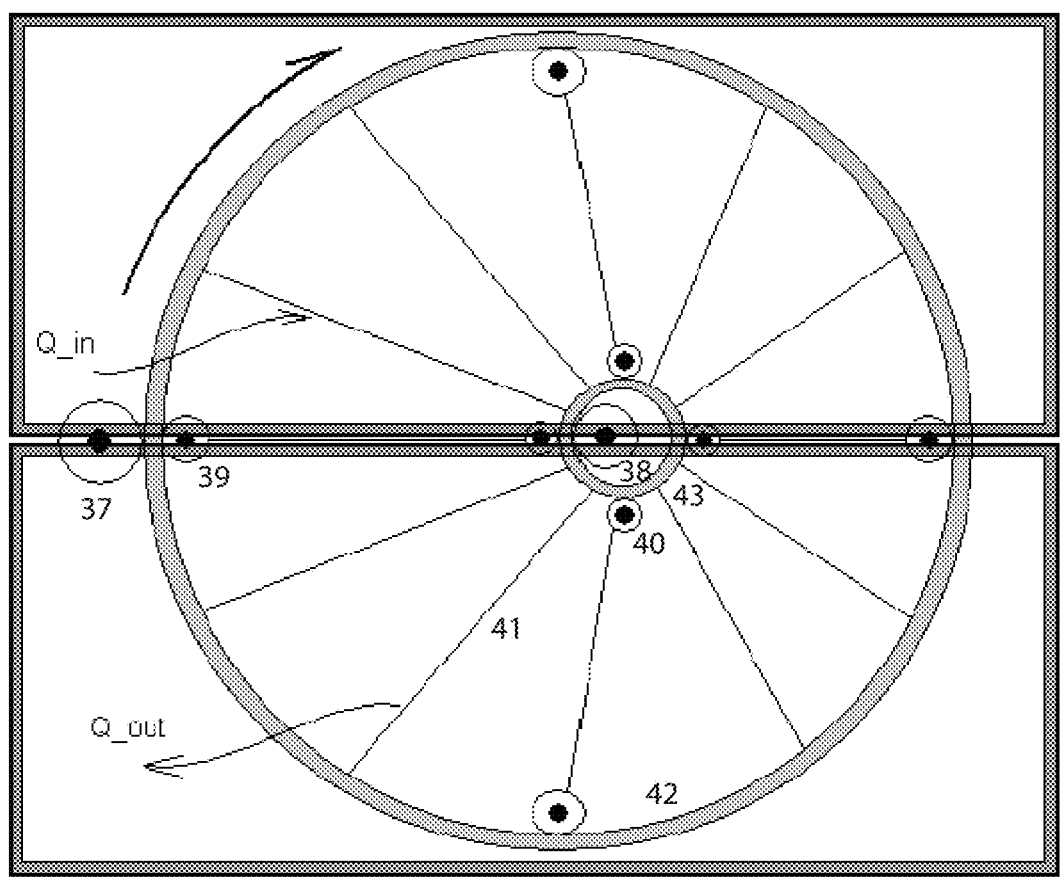
FIG. 15 is a graphical representation of a thermoelastic cooling system using drum design.

Another embodiment of the invention provides a thermoelastic cooling system using a rotating drum design as illustrated in FIG. 15. FIG. 15 illustrates the overall drum system design in which the main parts are the major driving wheel 37, second driving wheel 38, outside idling wheels 39, inside idling wheels 40, thermoelastic wires with the same initial lengths 41 (which equals the shortest wire in the right part in FIG. 15), outside holding shell 42 and inside holding shell 43. During operation, the major driving wheel 37 and the second driving wheel 38 drive the outside holding shell 42 and the inside holding shell 43, which hold the thermoelastic wires 41, rotating clockwise with same frequencies. The rotating axes of the two drums holding the refrigerant wires are offset up to 10% of the wire length. During the shell rotation, because the rotation centers are offset, the thermoelastic wires 41 between the two drums will be cyclically stretched and released as the drums rotate. The outside idling wheels 39 and the inside idling wheels 40 hold the shells (42 and 43) positions and provide forces for the stretched thermoelastic wires 41. When any wire is stretched longer and longer from the shortest condition (when it is at the right end of the cycle) to the longest condition (when it is at the left end of the cycle), induced by the tensile force, it will transform from one solid state phase to the other solid state phase and release latent heat (Q_out) into the working medium in the hot tank. Then when the wire passes the longest condition region and is released, it will transform back to the original phase and absorb latent heat (Q_in) that equals the latent heat of the phase transformation from the cool tank. While the wires are under tension, they have potential energy which induces the ring to rotate so that their tension is released. Thus, the mechanical energy used to load (stretch) the wires is, in turn, used to drive the mechanism, which constitutes recovery of the mechanical energy during the releasing process in each cycle for each wire. Suitable materials for the thermoelastic wires and the plates in the drum design shown in FIG. 15 are 1-D working SMA materials and 2-D SMA materials, respectively. Further, the thermoelastic wires (1-D SMA materials) can be replaced with thermoelastic strips and sheets made of 2-D SMA materials.

Figure 16A:
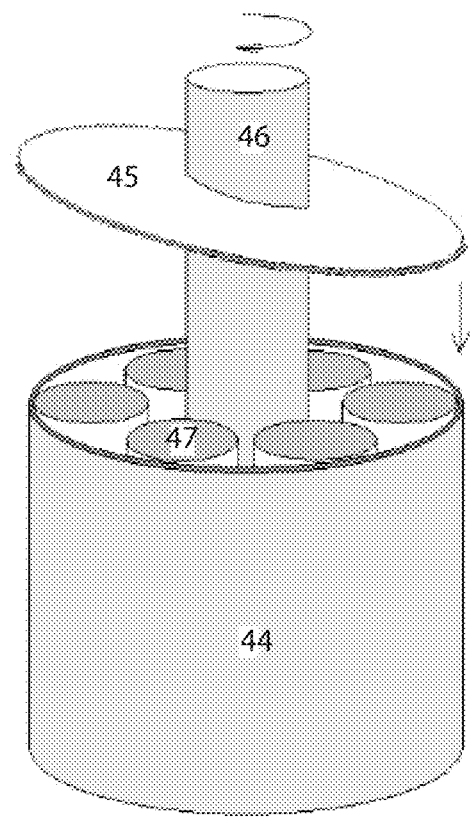
FIGS. 16A to 16C are graphical representations of a thermoelastic cooling system using rotation compression design.
Figure 16B:
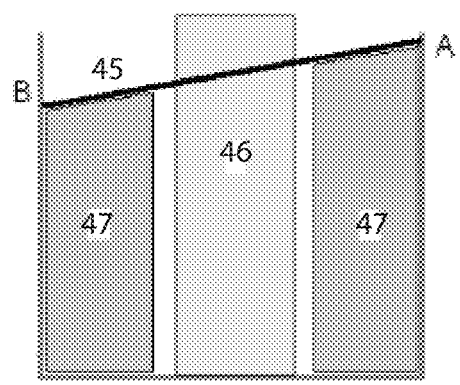
Figure 16C:
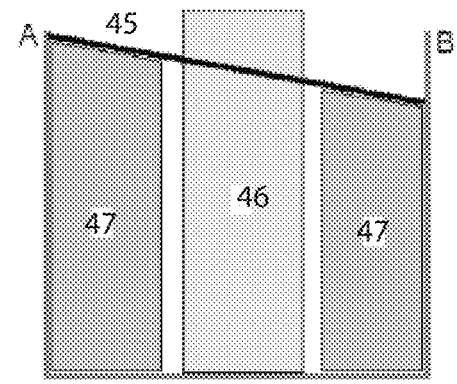

Another embodiment of the invention provides a thermoelastic cooling system using a rotation compression design as illustrated in FIGS. 16A, 16B, and 16C. The main parts of the rotation compression design shown in FIGS. 16A, 16B, and 16C are outside wall 44, top compression-loading plate 45, center driving shaft 46, and refrigerant units with same volumes 47. As shown in FIG. 16A, the top compression-loading plate 45 is tilted with a designed angle, and is attached to the driving shaft 46. During operation, the driving shaft 46 rotates at a designed frequency. When the top compression-loading plate 45 is pre-setup inside the wall 44, refrigerant units 47 on the side where the top compression-loading plate 45 is lower are fully compressed and phase transformed into the other phase, and refrigerant units 47 on the side where the top compression-loading plate 45 is higher are kept in the original phase. During operation, the driving shaft 46 is rotated with a designed frequency. When the lower side of the top compression-loading plate 45 rotates toward refrigerant units 47, those units undergo compression and phase transformation, thereby releasing the latent heat, until they are fully transformed, at which point, the latent heat release stops. In other words, the heat is generated when the refrigerant units 47 are compressed, and the heat must be removed from the system by dumping to the ambient or the heat sink. When the lower side rotates away from the refrigerant units 47, the compression in the refrigerant is released, and the refrigerant units 47 transform back to austenite, thereby absorbing heat. While the refrigerant units 47 are under compression, they have potential energy which pushes back on the top compression-loading plate 45 so that their compression is released. As such, the mechanical energy used to load (compress) the refrigerants is, in turn, used to drive the mechanism. This constitutes recovery of the mechanical energy during the releasing process in each cycle for each refrigerant. Suitable refrigerant materials for the rotation compression system are 3-D SMA materials.

Various materials or refrigerants can be used for the embodiments of thermoelastic cooling system. The materials preferably exhibit reversible stress induced solid-to-solid phase transformation with latent heat greater than 12 J/g and requires a stress less than 250 MPa to induce the phase transformation. The temperature of the refrigerated space is higher than the austenite finish temperature of the materials so as to ensure that the refrigerant, once removed from stress application, can be fully recovered from the stress induced martensite to the austenite state. The refrigerant can only absorb most of the latent heat when it transforms from the most martensite state to the most austenite state. For example, existing alloys such as NiTi, CuAlNi, CuZnAl, FePd, NiMnGa, FeMn, CuZnNi, AuCd, etc., and derivative alloys of NiTi, CuAlNi, CuZnNi, FePd, AuCd, and NiMnGa with adjusted heat treatment profile, or with additives such as C, H, or other transition metals are preferable materials.

Non-metallic materials can also be for thermoelastic cooling system. In addition to the metallic thermoelastic materials, certain polymers can also be used as the thermoelastic refrigerant.

It will be apparent to those skilled in the art that various modification and variations can be made in the present invention without departing from the spirit or scope of the invention. Thus, it is intended that the present invention cover modifications and variations that come within the scope of the appended claims and their equivalents. For example, in order to appropriately couple any one of the exemplary regenerators disclosed in this application to a heat sink and to a refrigeration space (i.e., a space to be refrigerated), those skilled in the art can readily apply or appropriately modify known thermal coupling schemes and structures (in place of or in addition to those novel structures disclosed above) so that the heat release and absorption characteristics of the regenerator of the present invention are effectively utilized to construct a cooling system. Therefore, it is intended that cooling systems and heat exchange systems that are constructed of any combinations of the regenerator of the present invention with such known thermal coupling schemes and structures are within the scope of the present invention, insofar as such systems come within the scope of the appended claims and their equivalents.

The invention claimed is:

1. A cooling system, comprising:
a heat sink;
a refrigerated space; and
a regenerator connected to the refrigerated space and to the heat sink such that the regenerator can pump heat from the refrigerated space to the heat sink,
wherein the regenerator comprises:
a plurality of solid refrigerant materials capable of exhibiting a thermoelastic effect, each refrigerant material being a solid columnar thermoelastic member having a top face;
a center driving shaft; and
a top compression-loading plate obliquely fixed to the center driving shaft,
wherein the solid columnar thermoelastic members are disposed around the center driving shaft with their respective top faces abutting the top compression-loading plate such that, when the center driving shaft is driven to rotate the top compression-loading plate, the solid columnar thermoelastic members are successively stressed by compression and relaxed.

2. The cooling system of claim 1, wherein the solid refrigerant materials comprise a composite of at least one of Nickel Titanium alloys, Copper Aluminum Nickel, Copper Zinc Nickel, Copper Zinc Aluminum, Iron Palladium, Gold Cadium, Nickel Manganese Gallium, Iron Manganese, and derivative alloys of Nickel Titanium alloys, Copper Aluminum Nickel, Copper Zinc Nickel, Iron Palladium, Gold Cadium, Iron Manganese, or Nickel Manganese Gallium.

3. The cooling system of claim 1, wherein the regenerator is connected to the refrigerated space and to the heat sink through direct contact.

4. The cooling system of claim 1, wherein the regenerator is connected to the refrigerated space and to the heat sink through a circulating heat exchange medium.

5. The cooling system of claim 1, wherein:
the solid columnar members have respective longitudinal axes that are parallel to and spaced apart from each other, and
the longitudinal axes of the solid columnar members are parallel to and spaced apart from a first axis about which the top compression-loading plate is rotated.

6. The cooling system of claim 1, wherein the solid columnar thermoelastic members and the compression-loading plate are arranged such that:
a first member of the solid columnar thermoelastic members is compressed by the compression-loading plate to have a fully stressed state, so as to fully transform to martensite phase thereby releasing heat;
at a same time, a second member of the solid columnar thermoelastic members is relaxed by the compression-loading plate to have a fully relaxed state, so as to fully transform to austenite phase thereby absorbing heat, the second member being on an opposite side of the center driving shaft from the first member; and
at the same time, third and fourth members of the solid columnar thermoelastic members are compressed by the compression-loading plate to have a partially stressed state, so as to be in a middle of a reversible transformation between martensite and austenite phases, the third and fourth members being between the first and second members in a side view, the fourth member being on an opposite side of the center driving shaft from the third member.

7. The cooling system of claim 1,
wherein the solid refrigerant materials release heat to the heat sink when the solid refrigerant materials are in thermal contact with the heat sink while the solid refrigerant materials are being stressed; and
wherein the solid refrigerant materials absorb heat from the refrigerated space when the solid refrigerant materials are in thermal contact with the refrigerated space while the solid refrigerant materials are being relaxed from a previously stressed state.

8. The cooling system of claim 7, wherein the solid columnar thermoelastic members are arranged with respect to the center driving shaft such that a first one of the solid columnar thermoelastic members is compressed by the top compression-loading plate to stress said first one at a same time as a second one of the solid columnar thermoelastic members, which is on an opposite side of the center driving shaft from the first one, is relaxed by the top compression-loading plate.

9. The cooling system of claim 1, wherein the solid refrigerant materials undergo reversible austenite to martensite phase transition upon application of stress.

10. The cooling system of claim 9, wherein heat is released when the solid refrigerant materials undergo reversible austenite to martensite phase transition, and wherein said heat is greater than 1 J/g.

11. The cooling system of claim 9, wherein the solid refrigerant materials comprise a composite of polymers that exhibit reversible solid to solid transition associated with absorbing or releasing heat.

12. The cooling system of claim 9, wherein the solid refrigerant materials completely transform from martensite to austenite phase at a temperature that is equal to or lower than the designed temperature of the refrigerated space.

13. A cooling system, comprising:
a heat sink;
a refrigeration space; and
a regenerator comprising:
a plurality of columnar thermoelastic members, each columnar thermoelastic member having an end face, each columnar thermoelastic member further having an austenite phase and a martensite phase, the columnar thermoelastic members undergoing:
a phase transition from the austenite phase to the martensite phase, releasing latent heat, when mechanically stressed; and
a phase transition from the martensite phase to the austenite phase, absorbing latent heat, when relaxed from the mechanically-stressed state; and
stress and relax means for:
successively mechanically stressing by compression each columnar thermoelastic member to cause the phase transition from the austenite phase to the martensite phase to release the latent heat to the heat sink, and
successively relaxing the mechanically-stressed state of each columnar thermoelastic member to cause the phase transition from the martensite phase to the austenite phase to absorb the latent heat from the refrigeration space.

14. The cooling system of claim 13, wherein:
the stress and relax means comprises a center driving shaft and a top compression-loading plate obliquely fixed to the center driving shaft, and
the plurality of columnar thermoelastic members are disposed around the center driving shaft with their respective end faces abutting the top compression-loading plate such that, when the driving shaft is driven to rotate the top compression loading plate, the plurality of columnar thermoelastic members are successively stressed and relaxed.

15. A regenerator for use in a heat exchange system to extract heat from a refrigeration space and release heat to a heat sink, the regenerator comprising:
a plurality of columnar thermoelastic members, each columnar thermoelastic member having an austenite phase and a martensite phase, the columnar thermoelastic members undergoing:
a phase transition from the austenite phase to the martensite phase, releasing latent heat, when mechanically stressed; and
a phase transition from the martensite phase to the austenite phase, absorbing latent heat, when relaxed from the mechanically-stressed state; and
stress and relax means for:
successively mechanically stressing by compression each columnar thermoelastic member to cause the phase transition from the austenite phase to the martensite phase to release the latent heat, and
successively relaxing the mechanically-stressed state of each columnar thermoelastic member to cause the phase transition from the martensite phase to the austenite phase to absorb the latent heat.

16. The regenerator according to claim 15, wherein the columnar thermoelastic members
are arranged with respect to the stress and relax means such that a first one of the columnar thermoelastic members is mechanically stressed by compressing the first one at a same time as a second one of the columnar thermoelastic members is relaxed.

17. The regenerator according to claim 15, wherein said columnar thermoelastic members each comprise a composite of at least one of Nickel Titanium alloys, Copper Aluminum Nickel, Copper Zinc Nickel, Copper Zinc Aluminum, Iron Palladium, Gold Cadium, Nickel Manganese Gallium, Iron Manganese, and derivative alloys of Nickel Titanium alloys, Copper Aluminum Nickel, Copper Zinc Nickel, Iron Palladium, Gold Cadium, Iron Manganese, or Nickel Manganese Gallium.

18. The regenerator according to claim 15, wherein said columnar thermoelastic members each comprise a composite of polymers that exhibit reversible solid to solid transition associated with absorbing or releasing heat.

19. The regenerator according to claim 15, wherein said columnar thermoelastic members are each shaped as a solid rod.

20. The regenerator according to claim 15,
wherein the stress and relax means comprises a center driving shaft and a top compression-loading plate obliquely fixed to the center driving shaft, and
wherein the plurality of columnar thermoelastic members are disposed around the center driving shaft with respective surfaces in contact with the top compression-loading plate so that when the driving shaft is driven to rotate the top compression-loading plate, the plurality of columnar thermoelastic members are successively stressed and relaxed.

* * * * *